US012580762B2

(12) United States Patent
Wu et al.

(10) Patent No.: US 12,580,762 B2
(45) Date of Patent: Mar. 17, 2026

(54) SELF-SUPERVISED MULTI-AGENT COOPERATION FRAMEWORK

(71) Applicant: Kabushiki Kaisha Toshiba, Tokyo (JP)

(72) Inventors: Wenbo Wu, Bristol (GB); Marius David Jurt, Bristol (GB); Ben Richard Holden, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 253 days.

(21) Appl. No.: 18/357,800

(22) Filed: Jul. 24, 2023

(65) Prior Publication Data

US 2025/0038975 A1     Jan. 30, 2025

(51) Int. Cl.
  *H04L 9/30*          (2006.01)
  *G05B 19/4155*     (2006.01)
(52) U.S. Cl.
  CPC ............ *H04L 9/30* (2013.01); *G05B 19/4155* (2013.01); *G05B 2219/50391* (2013.01)
(58) Field of Classification Search
  CPC .................. H04L 9/30; G05B 19/4155; G05B 2219/50391
  See application file for complete search history.

(56) References Cited

U.S. PATENT DOCUMENTS 11,184,175 B2     11/2021   Soundararajan et al.
11,757,642 B1 *    9/2023   Moore .................. H04L 9/3213
                                                          726/4
11,875,188 B2 *    1/2024   Simpson ............... G06F 9/5027
2017/0041148 A1     2/2017   Pearce
2020/0255776 A1 *   8/2020   Schmiedel ............. C11D 17/06
2021/0247776 A1 *   8/2021   Faye ..................... H04L 9/3271
                                                          (Continued)

OTHER PUBLICATIONS

Lyu et al. "Threats to federated learning: A survey" arXiv preprint arXiv:2003.02133. 2020 (7 pages).
                                                          (Continued)

*Primary Examiner* — Yonas A Bayou
(74) *Attorney, Agent, or Firm* — Oblon, McClelland, Maier & Neustadt, L.L.P.

(57)          ABSTRACT

A multi-agent system comprising an administrator configured to maintain a directed acyclic graph, hereinafter DAG, and a plurality of autonomous robots using asymmetric encryption for identification to at least one of the administrator other robots of the plurality of autonomous robots and configured for:
  a robot of the a plurality of autonomous robots to obtain a physical task from a dynamic task list, to perform the physical task and to, upon completion of the task, append task completion information to the DAG; and
  another robot of the a plurality of autonomous robots to, independent of the autonomous robots that has appended the completion information to the DAG, physically and cryptographically verify that a task appended to the DAG by the autonomous robot that has appended the completion information to the DAG has been completed in accordance with the completion information, wherein cryptographic verification includes checking a cryptographic identifier of the autonomous robots that has appended the completion information to the DAG.

20 Claims, 15 Drawing Sheets

(56) References Cited

U.S. PATENT DOCUMENTS

2022/0107624 A1* 4/2022 Amin .......................... B25J 3/00

OTHER PUBLICATIONS

Dorri et al. "Multi-agent systems: A survey" IEEE Access, 6, pp. 28573-28593. 2018 (21 pages).
Wen et al. "Swarm robotics control and communications: Imminent challenges for next generation smart logistics" IEEE Communications Magazine, 56(7), pp. 102-107. 2018 (6 pages).
Ferrer et al. "Secure and secret cooperation in robot swarms" Science Robotics, 6(56), p. eabf1538. 2021 (10 pages).
Strobel et al. "Managing byzantine robots via blockchain technology in a swarm robotics collective decision making scenario" 2018 (9 pages).
Calvaresi et al. "Reputation management in multi-agent systems using permissioned blockchain technology" IEEE/WIC/ACM international conference on web intelligence (WI) (pp. 719-725). IEEE. 2018 (7 pages).
Zhu et al. "Applications of distributed ledger technologies to the internet of things: A survey" ACM computing surveys (CSUR), 52(6), pp. 1-34. 2019. (34 pages).

Saho et al. "Survey on Asymmetric Cryptographic Algorithms in Embedded Systems" IJISRT, 5, pp. 544-554. 2020. (11 pages).
Bijani et al. "A review of attacks and security approaches in open multi-agent systems" Artificial Intelligence Review, 42(4), pp. 607-636. 2014. (30 pages).
Ferrer The blockchain: a new framework for robotic swarm systems. In Proceedings of the future technologies conference (pp. 1037-1058). Springer, Cham. (22 pages).
Popov "The tangle" White paper, 1(3). 2017. (28 pages).
Liu et al. "Distributed ledger technology" Intelligent Internet of Things (pp. 393-431). Springer, Cham. 2020. (39 pages).
Nakamoto "Bitcoin: A peer-to-peer electronic cash system" Decentralized Business Review, p. 21260. 2008. (9 pages).
Dai et al. Blockchain for Internet of Things: A survey. IEEE Internet of Things Journal, 6(5). pp. 8076-8094. (19 pages) 2019.
Amoretti et al. "Blockchain-based proof of location" 2018 IEEE International Conference on Software Quality, Reliability and Security Companion (QRS-C) (pp. 146-153). IEEE. 2018 (8 pages).
Wu et al. Blockchain based zero-knowledge proof of location in IoT. In ICC 2020-2020 IEEE International Conference on Communications (ICC) (pp. 1-7). IEEE. 2020 (7 pages).

* cited by examiner

410 — Identify object when robot passes by the object

420 — Identify most recent transaction associated with the object in DAG

430 — Check validity of identified transaction

440 — Physical verification of transaction completion

450 — Place verification result on ledger

460 — Receive reputation reward

400

| ○ □ △ | Self-supervised Secure Swarm Robotic System | | | | | | |
|---|---|---|---|---|---|---|---|
| SA0-7 - 1 | SA1-7 - 3 | SA2-7 - 6 | SA3-7 - 2 | SA4-7 - 2 | SA5-7 - 5 | SA6-7 - 0 | SA7-7 - 4 |
| SA0-6 - 2 | SA1-6 - 4 | SA2-6 - 8 | SA3-6 - 1 | SA4-6 - 1 | SA5-6 - 1 | SA6-6 - 2 | SA7-6 - 2 |
| SA0-5 - 1 | SA1-5 - 1 | SA2-5 - 3 | SA3-5 - 1 | SA4-5 - 2 | SA5-5 - 2 | SA6-5 - 1 | SA7-5 - 2 |
| SA0-4 - 2 | SA1-4 - 3 | SA2-4 - 3 | SA3-4 - 2 | SA4-4 - 3 | SA5-4 - 3 | SA6-4 - 2 | SA7-4 - 2 |
| SA0-3 - 3 | SA1-3 - 5 | SA2-3 - 4 | SA3-3 - 2 | SA4-3 - 1 | SA5-3 - 2 | SA6-3 - 1 | SA7-3 - 6 |
| SA0-2 - 3 | SA1-2 - 2 | SA2-2 - 3 | SA3-2 - 3 | SA4-2 - 4 | SA5-2 - 2 | SA6-2 - 3 | SA7-2 - 5 |
| SA0-1 - 1 | SA1-1 - 3 | SA2-1 - 4 | SA3-1 - 4 | SA4-1 - 2 | SA5-1 - 1 | SA6-1 - 5 | SA7-1 - 3 |
| SA0-0 - 4 | SA1-0 - 1 | SA2-0 - 2 | SA3-0 - 4 | SA4-0 - 7 | SA5-0 - 3 | SA6-0 - 8 | SA7-0 - 3 |

FIG. 6

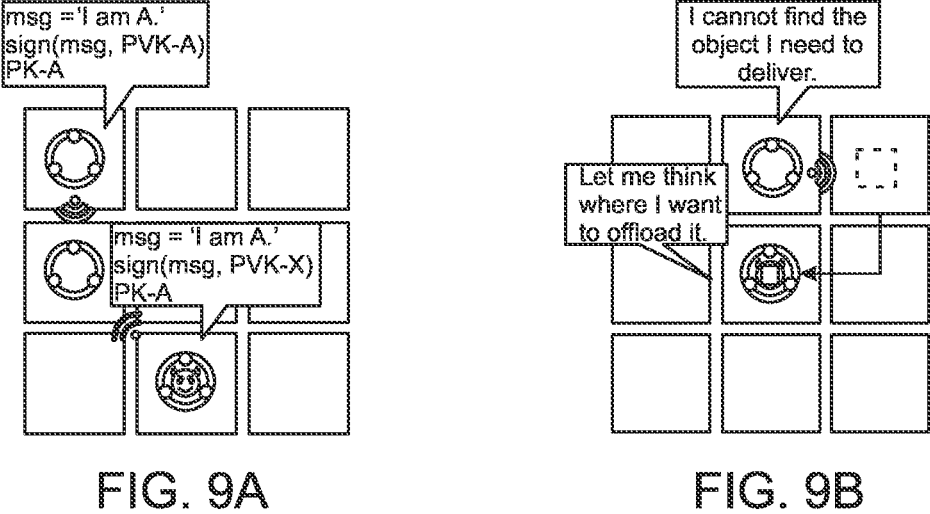
FIG. 9A            FIG. 9B
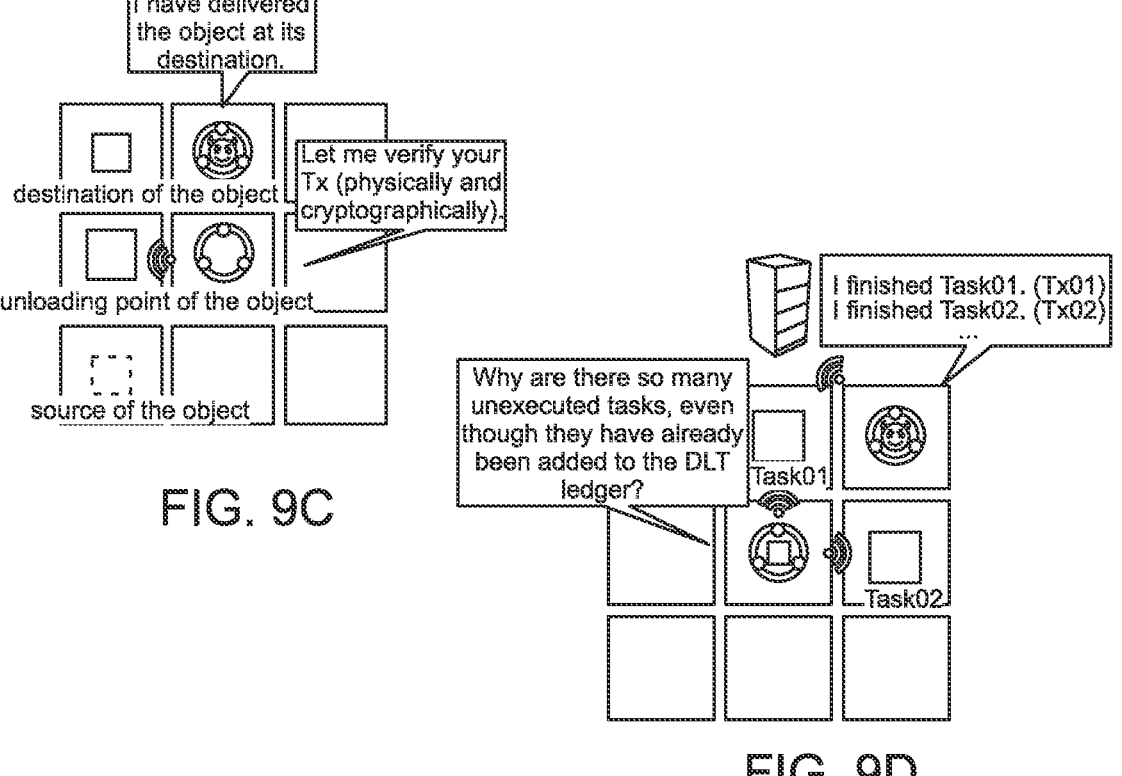
FIG. 9C
FIG. 9D

SELF-SUPERVISED MULTI-AGENT COOPERATION FRAMEWORK

FIELD

Embodiments described herein relate generally to multi-agent systems and more specifically to a framework for cooperation in multi-agent systems.

BACKGROUND

Multi-Agent System (MAS) organizes a large number of robots to build an autonomous system to perform tasks that a single robot cannot complete. Compared to traditional robotics, MAS is more intelligent regarding task execution and cooperation. Such a system has numerous applications ranging from agriculture, military, healthcare, and logistics to environmental monitoring. In MAS each item must go through different processes, such as picking, packing, and dispatching in a warehouse, before it can be dispatched. There will be a variety of robots with different functions (e.g., parcel shipping robots, shelf shipping robots, unmanned aerial vehicles (UAVs), and robot arms) to be added to the MAS to perform these processes. However, robots with different functions may come from different manufacturers, giving rise to challenges in interoperability and security.

The degree of autonomy of Multi-Agent System (MAS) continues to increase towards systems, such as warehouses, that can be operated without or substantially without requirement for human operators. A fully intelligent MAS requires the collaboration of multiple robots with different functions, which may originate from different manufacturers. Ensure that the heterogeneous robots from different manufacturers in the system are trustworthy and can complete their tasks truthfully because of several potential attacks (e.g., self-failure, malfunctioning, illegitimate intruders) is challenging.

In the following, embodiments will be described with reference to the drawings in which.

Figure 5:
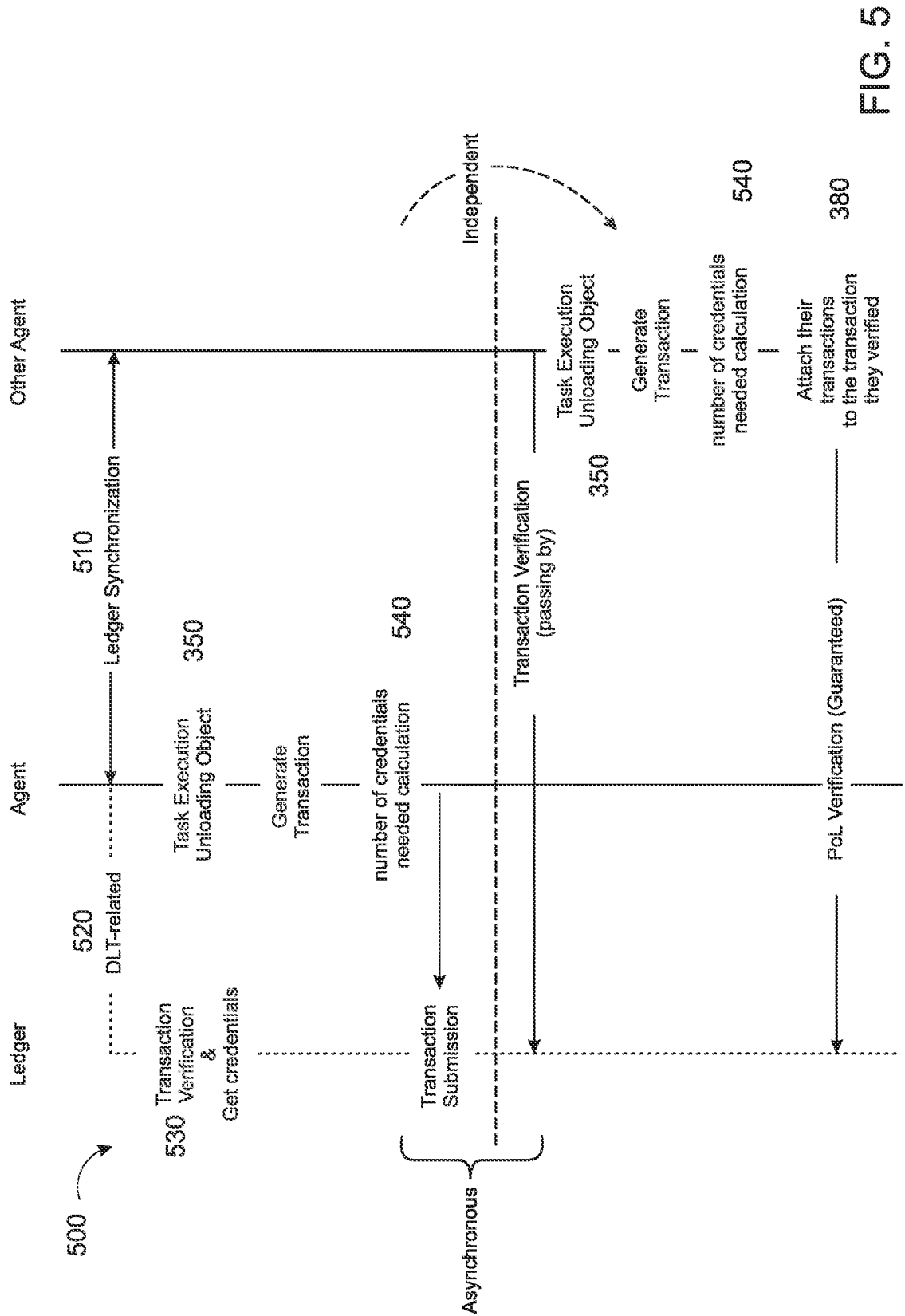
Figure 7:
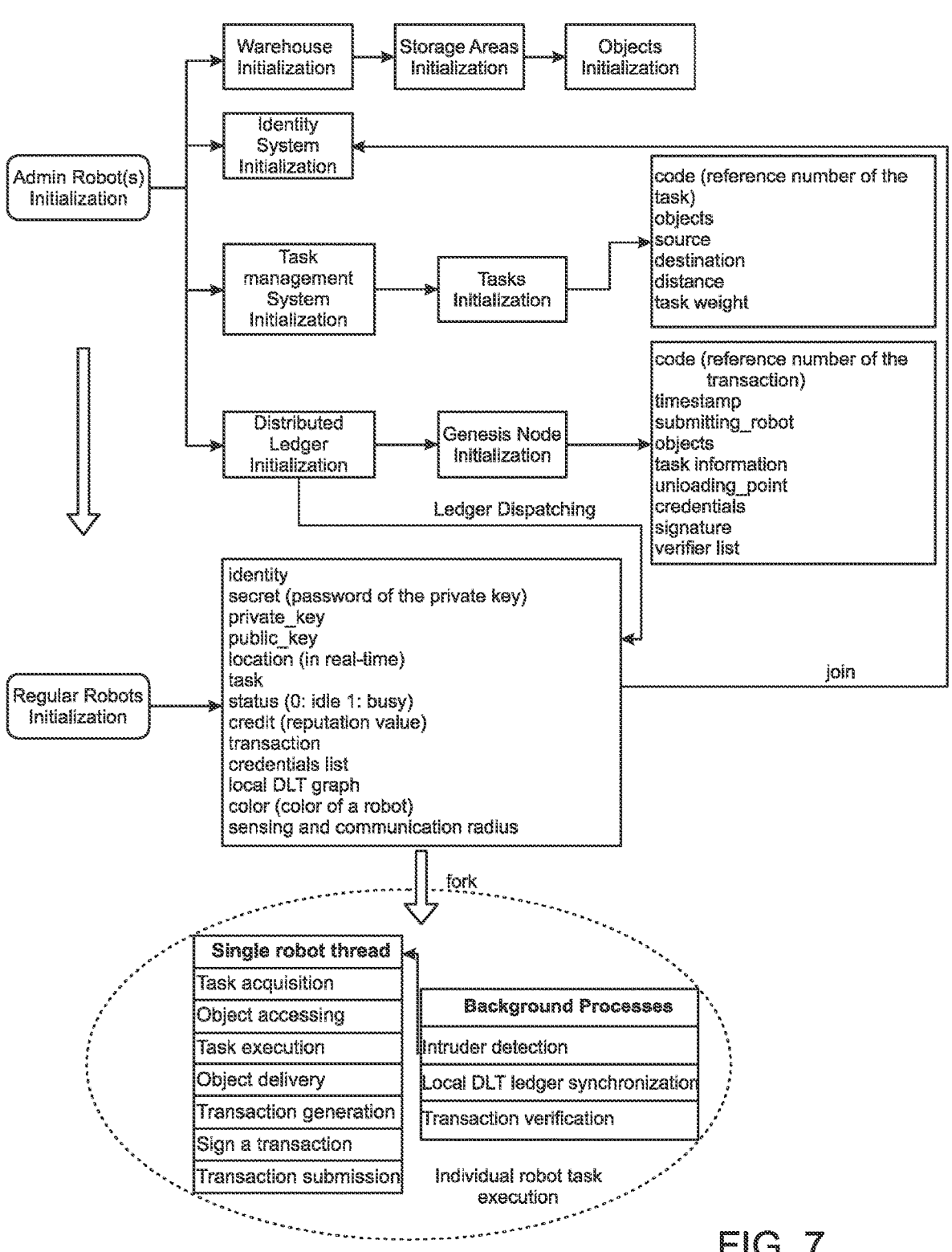
Figure 8:
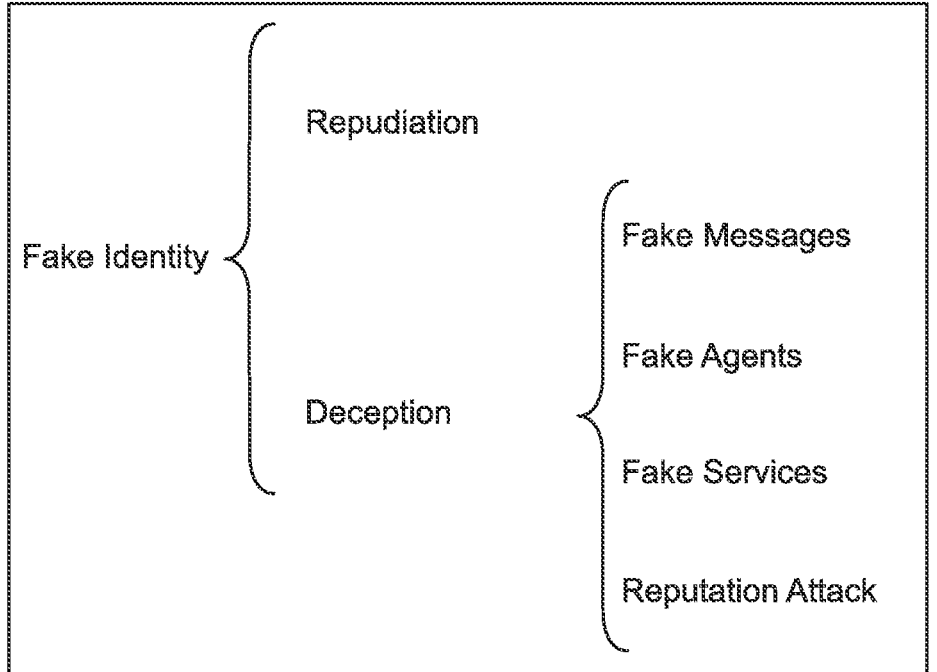
Figure 10:
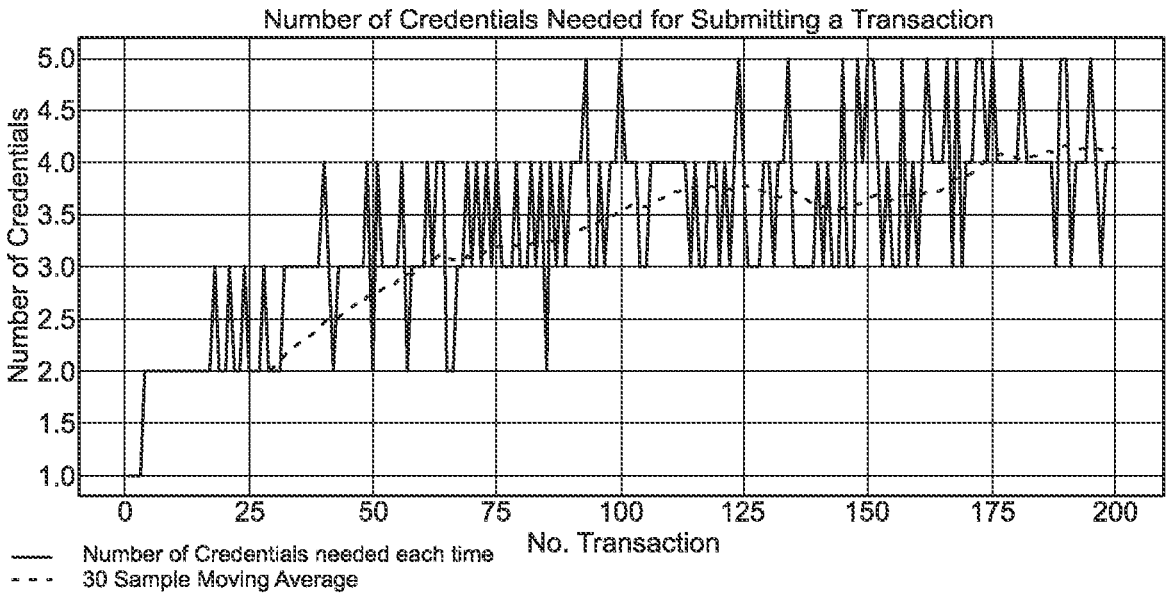
Figure 11:
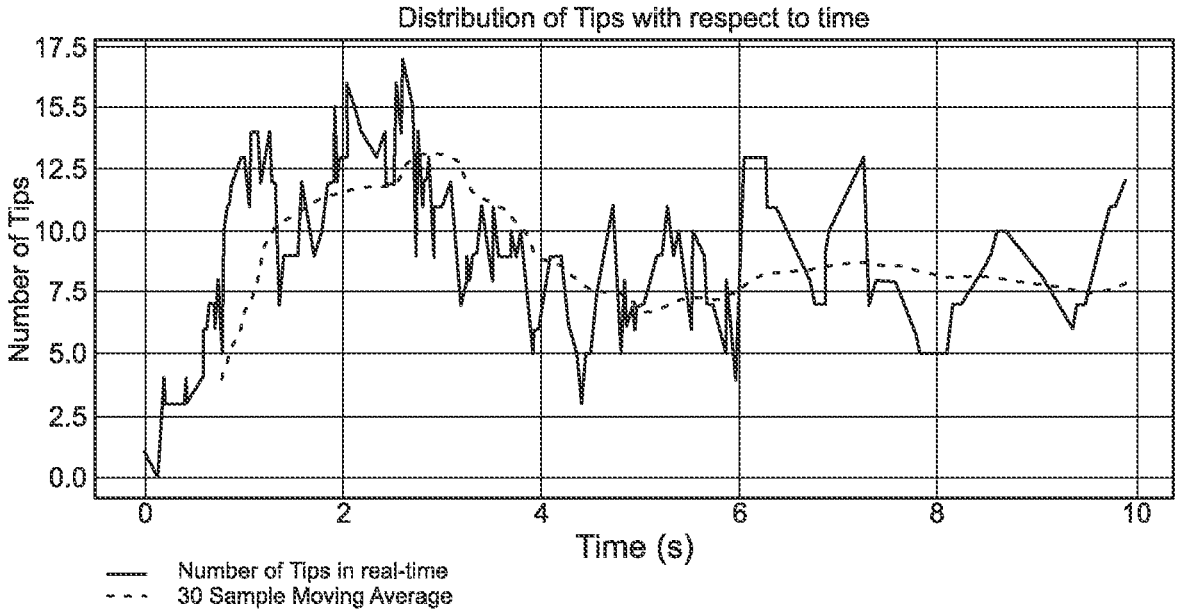
Figure 12:
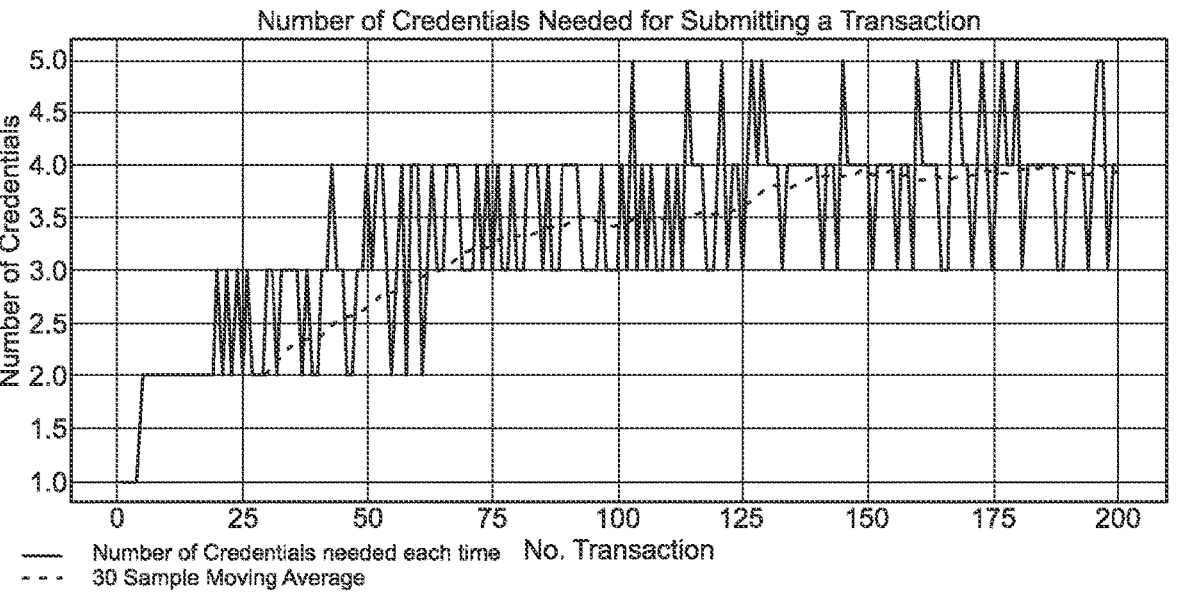
Figure 13:
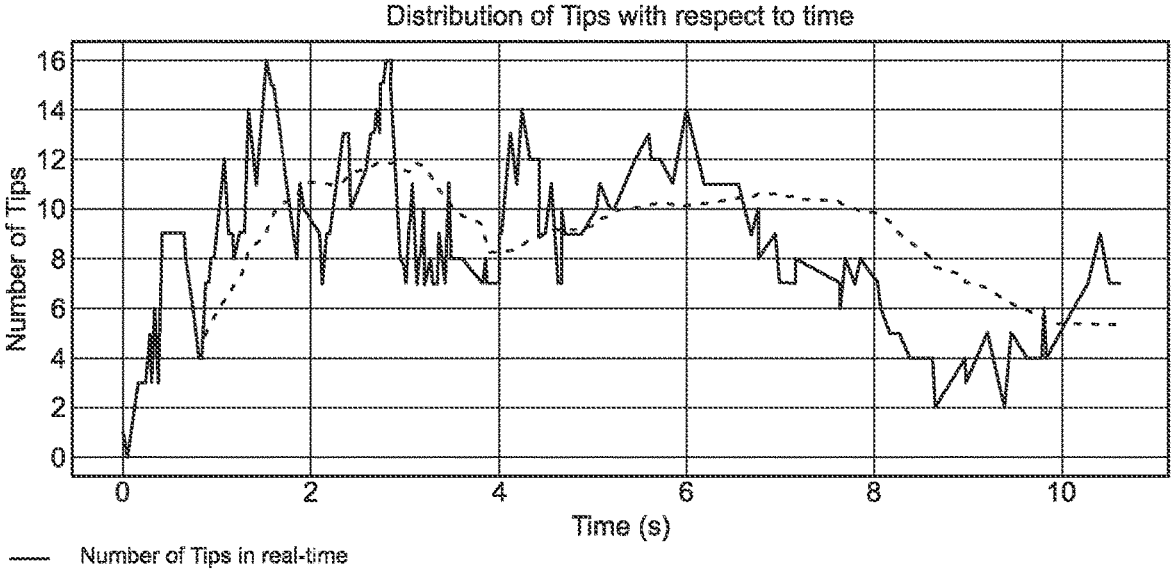
Figure 14:
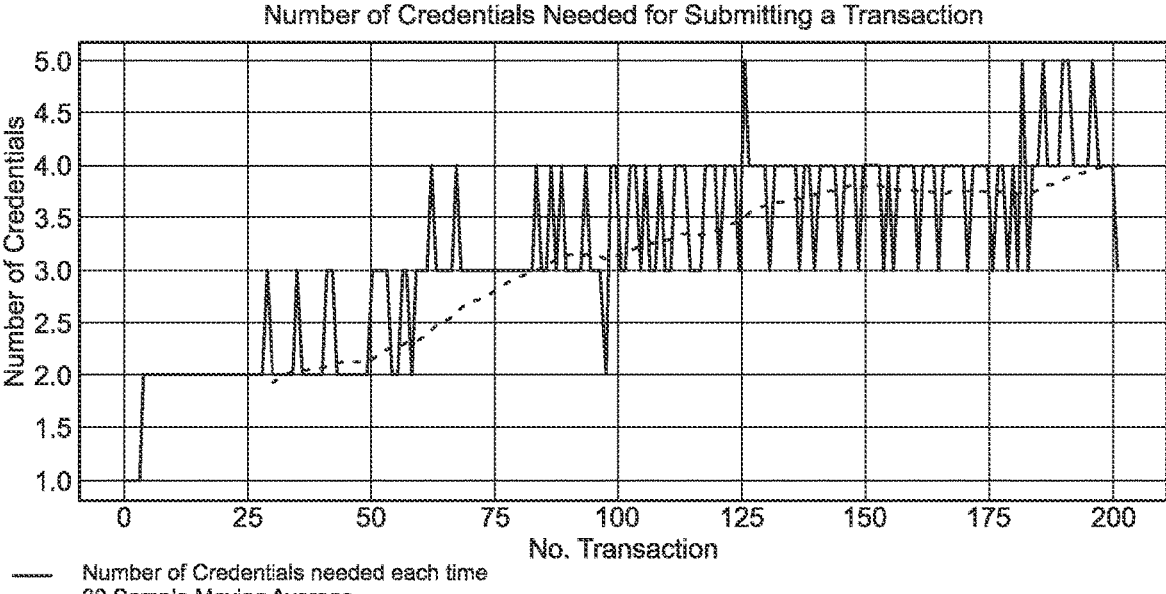
Figure 15:
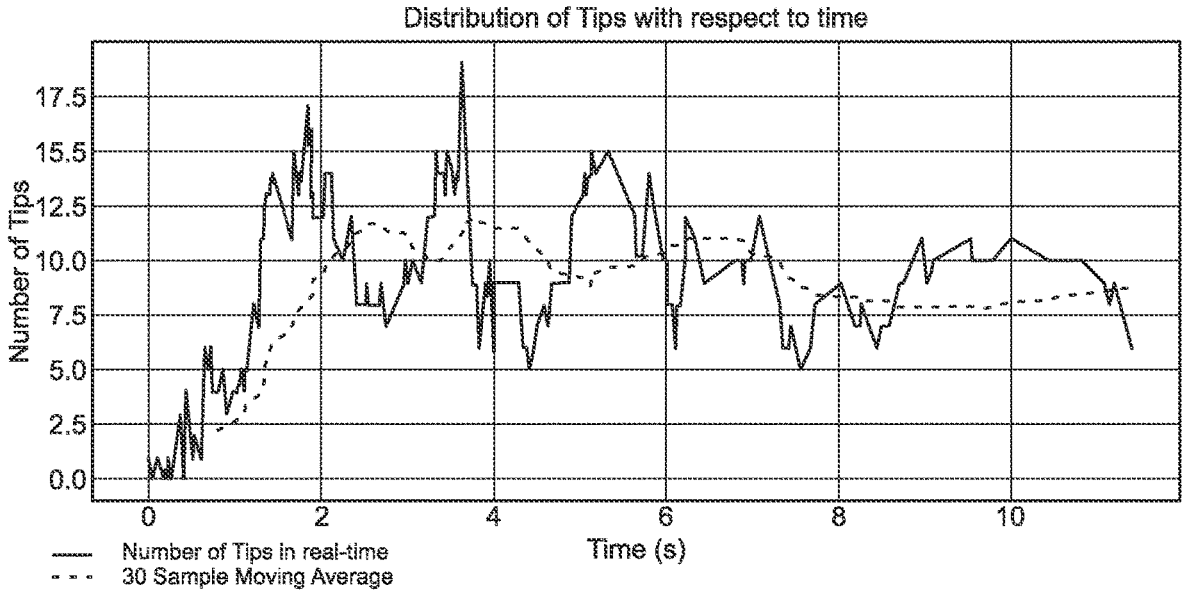
Figure 16:
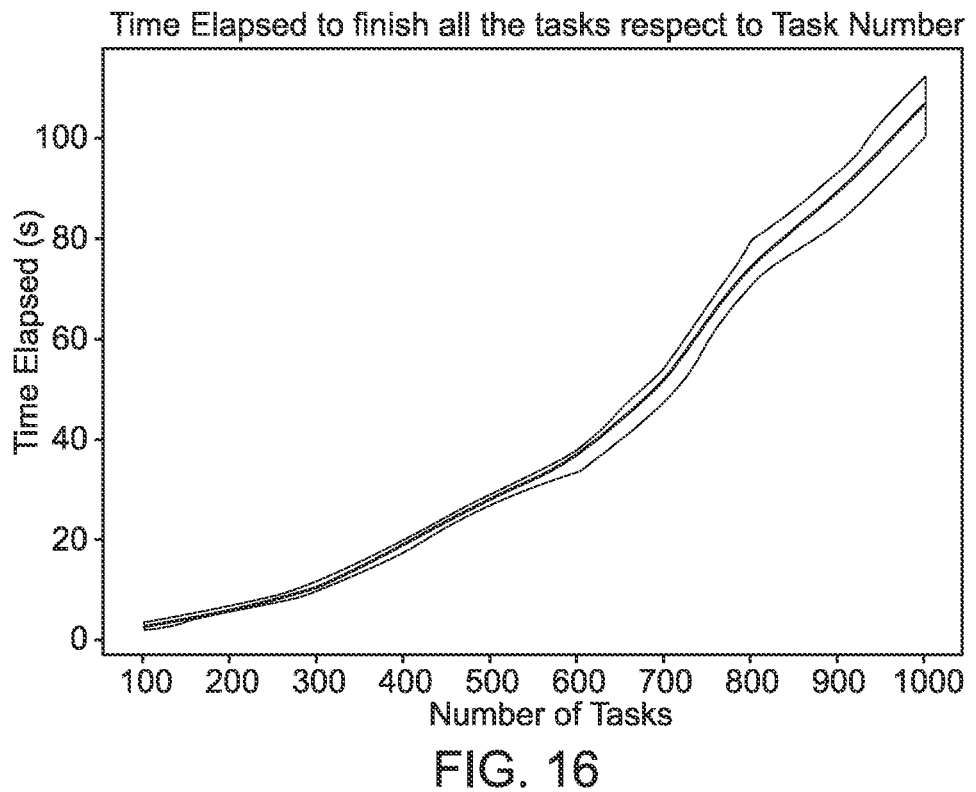
Figure 17:
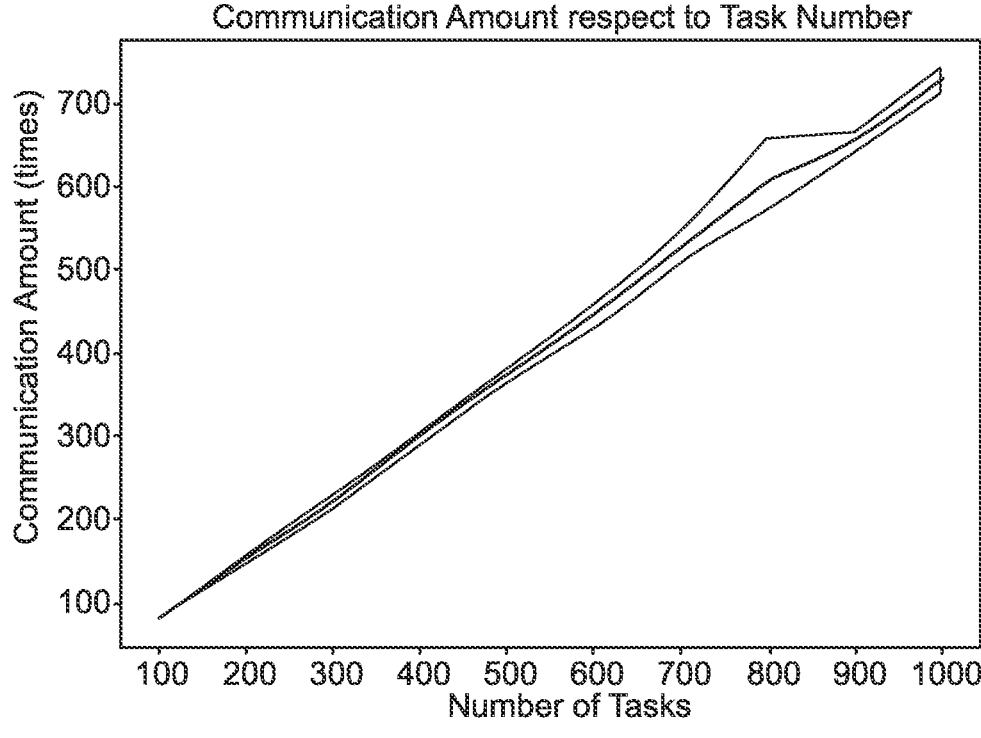
Figures 18, 19, 20, 21:
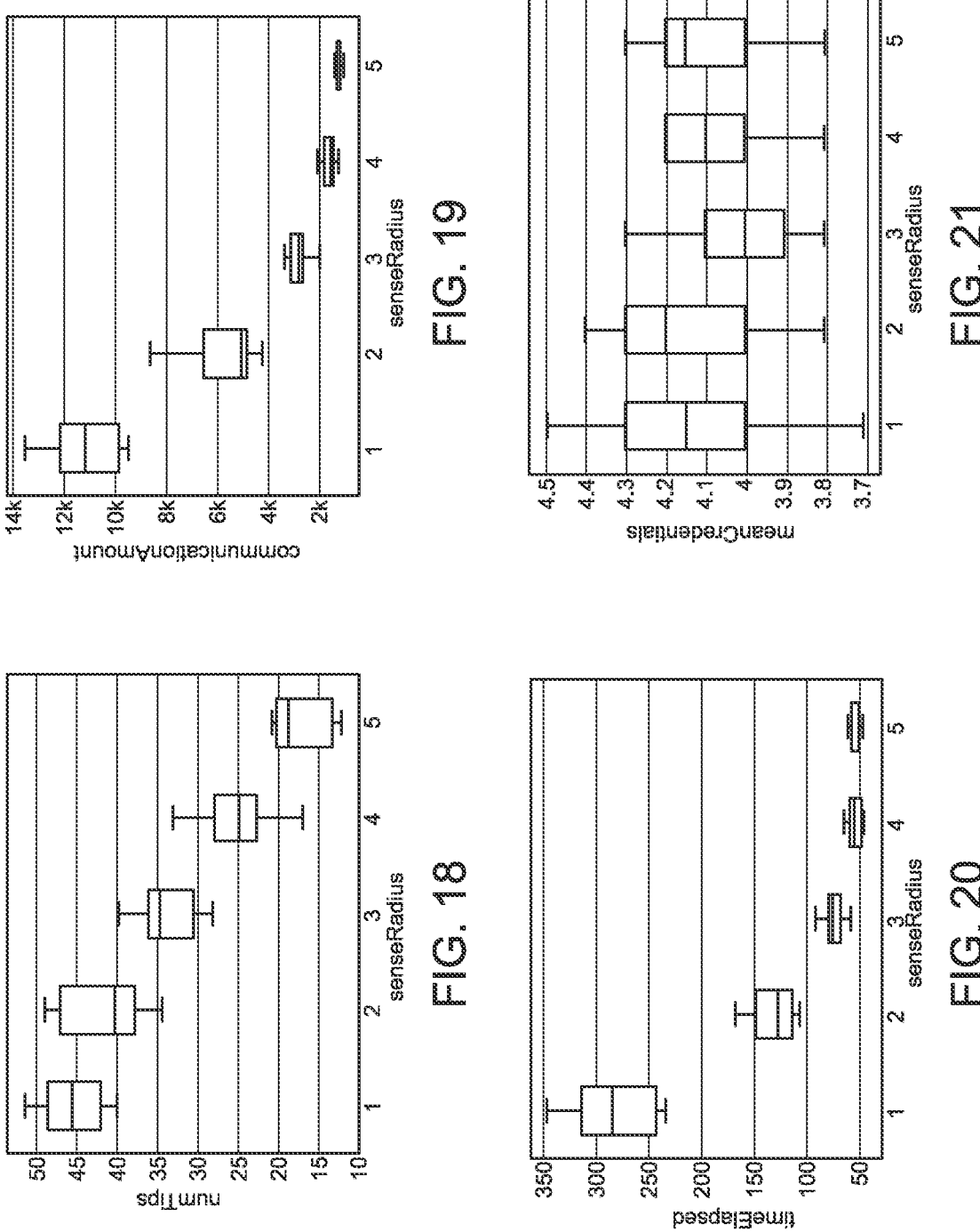

FIG. 5 provides another illustration of a method in which a robot 120 interacts with a ledger and other robots;

FIG. 6 shows a simulation of a warehouse scenario;

FIG. 7 shows an example of an initialisation of system according to an embodiment;

FIG. 8 categorizes five types of attack;

FIG. 9A shows a scenario in which a malicious robot submits a fake transaction to the distributed ledger;

FIG. 9B shows a scenario in which a malicious robot delivers items to a wrong storage area;

FIG. 9C illustrates an intra-fraud scenario;

FIG. 9D illustrates a Sybil attack;

FIG. 10 shows the credentials needed for submitting a transaction based on a non-attack simulation;

FIG. 11 shows the distribution of tips based on a non-attack simulation;

FIG. 12 shows the credentials needed for submitting a transaction based on a simulation including illegitimate intruders;

FIG. 13 shows the distribution of tips based on a simulation including illegitimate intruders;

FIG. 14 shows the credentials needed for submitting a transaction based on a simulation of an intra-fraud scenario;

FIG. 15 shows the distribution of tips based on a simulation of an intra-fraud scenario;

FIG. 16 illustrates variations in task completion times depending on the number of tasks to be completed;

FIG. 17 illustrates communication amounts depending on the number of tasks to be completed;

FIG. 18 illustrates the dependence of tips on the sensing radius of robots;

FIG. 19 illustrates the dependence of the communication amount on the sensing radius of robots;

FIG. 20 illustrates the dependence of task completion on the sensing radius of robots;

FIG. 21 illustrates the dependence of the number of verifications achieved on the sensing radius of robots.

DETAILED DESCRIPTION

According to an embodiment there is provided a multi-agent system comprising an administrator configured to maintain a directed acyclic graph, hereinafter DAG, and a plurality of autonomous robots using asymmetric encryption for identification to at least one of the administrator other robots of the plurality of autonomous robots and configured for:

a robot of the plurality of autonomous robots to obtain a physical task from a dynamic task list, to perform the physical task and to, upon completion of the task, append task completion information to the DAG; and another robot of the a plurality of autonomous robots to, independent of the autonomous robots that has appended the completion information to the DAG, physically and cryptographically verify that a task appended to the DAG by the autonomous robot that has appended the completion information to the DAG has been completed in accordance with the completion information, wherein cryptographic verification includes checking a cryptographic identifier of the autonomous robots that has appended the completion information to the DAG.

In an embodiment the plurality of autonomous robots is a plurality of mobile autonomous robots. In an embodiment one, more than one or all of the plurality of mobile autonomous robots is configured to transport items.

In an embodiment the multi-agent system is configured to only permit a robot of the plurality of autonomous robots to submit completion information to the administrator if the robot of the plurality of autonomous robots has physically and cryptographically verified a predetermined number of other pieces of completion information previously submitted to the DAG.

In an embodiment the robot of the plurality of autonomous robots receives a credential for each physically and cryptographically verification of a task submitted to the administrator.

In an embodiment the received credential is stored locally by the robot.

A multi-agent system as claimed in claim 2, wherein each robot of the plurality of autonomous robots is configured to, once the DAG has been initialised, only submit completion information to the auditor for appending to previously submitted completion information that has been physically and cryptographically verified by the robot.

In an embodiment the DAG is an IOTA DAG.

In an embodiment the administrator additionally maintains a list of tasks required to be completed, the administrator configured to submit information of one or more tasks to be completed to robots of the plurality of autonomous robots.

In an embodiment the list of tasks is a dynamic list of task that allows addition of new tasks and/or removal of tasks to be completed from the list whilst robots of the plurality of autonomous robots complete tasks.

In an embodiment the administrator is further configured to require investment by the robot of the plurality of autonomous robots of a reputation value in exchange for the information of one or more tasks to be completed.

In an embodiment a record of reputation values of all robots of the plurality of autonomous robots is maintained centrally within the system. In an embodiment the record of reputation values of all robots of the plurality of autonomous robots is maintained by the administrator.

In an embodiment the administrator does not release the information of one or more tasks to be completed if the robot of the plurality of autonomous robots to which the information is to be released has a remaining reputation value that is less than a reputation value required for release of the information.

In an embodiment the administrator further maintains a record of robots that have been identified to the system using said asymmetric encryption.

In an embodiment some or all of the invested amount of reputation is returned to the investing robot once a predetermined number of other robots of the plurality of autonomous robots has verified the correct completion of the task.

In an embodiment the administrator is configured to reward a robot of the plurality of autonomous robots by apportioning a part of the invested reputation value to a robot that has submitted verifying information that a task appended to the DAG by the robot of the autonomous robots that has appended the completion information to the DAG has been completed in accordance with the completion information.

In an embodiment the administrator is configured to make available previously submitted completion information for appending new completion information to in the DAG, if a number of verifications of the previously submitted completion information received by the administrator does not exceed a predetermined number.

In an embodiment the administrator is a robot configured to or capable of performing tasks within the system.

In an embodiment each robot of the plurality of autonomous robots can only register once with the system and wherein the system assigns a predetermined reputation value to each robot upon registration.

In an embodiment robots of the plurality of autonomous robots have differing technical specifications or abilities.

In an embodiment the robot of the plurality of robots generates the completion information by signing information including an identifier of the task and an indication of a physical location associated with the completed with its public key prior to submitting the completion information to the administrator.

In an embodiment the administrator is configured to compare cryptographic and physical verifications of completion information previously posted to the DAG received from different robots of the plurality of autonomous robots and, in cases where the cryptographic and physical verifications received from different robots differ, determine which cryptographic and physical verifications is to be treated as correct.

In an embodiment a robot of the plurality of robots that has submitted a cryptographic and physical verification that is not deemed to be correct by the administrator is identified as a malicious robot.

In an embodiment the system prevents allocating of tasks to robots that have been identified as malicious.

According to another embodiment there is provided an autonomous robot configured to:

obtain a physical task from a dynamic task list, perform the physical task and to, upon completion of the task, submit completion information to an administrator of the dynamic task list for appending task completion information to a DAG; and obtain information relating to tasks appended to the DAG by other robots, independent of the other robot, physically and cryptographically verify that a task appended to the DAG by the other robot has been completed in accordance with the information relating to tasks appended to the DAG, wherein cryptographic verification includes checking a cryptographic identifier of the other robot that has appended the completion information to the DAG.

In an embodiment the robot is configured to determined, based on a number of credentials stored by the robot and on a predetermined number of credentials required by a system maintaining the DAG for appending new completion information to the DAG, how many previously submitted tasks previously appended to the DAG by other robots need to be physically and cryptographically verified by the robot before the robot can append information relating to a task completed by the robot to the DAG.

In an embodiment the autonomous robot comprises sensors for sensing the robot's surroundings, the sensors having a sensory range and the robot configured to identify objects relating to tasks completed by other robots and/or other robots within its sensory range.

In an embodiment the sensors may be one or more cameras. In an embodiment the robot is configured to detect illegitimate intruders, for example a human or a robot without a valid identity, in its sensory range as it moves. The robot may be configured to use one or more different identity recognition methods, for example scanning QR code, request-response verification, NFC, RFID or computer vision.

In an embodiment the autonomous robot is further configured to identify objects relating to tasks completed by other robots and to obtain, from the DAG, information appended to the DAG and relating to the identified object, the obtained information comprising location information of the location of the object after completion of the task and to compare a current physical location of the object with the location information.

In an embodiment the autonomous robot is further configured to provide to an administrator and/or broadcast to other robots an identity of another robot deemed to have posted an incorrect physical location to the DAG.

In an embodiment the autonomous robot is further configured to operate within a system and to access records of other robots authenticated to operate within the system, wherein the obtained information further comprises an identifier of the robot that has posted the information to the DAG, the robot configured to compare the identifier with the accessed records.

In an embodiment the autonomous robot is further configured to obtain a copy or a partial copy of the DAG from the administrator and to prune the copy of the DAG by deleting non-current transaction information relating to an object or transaction information relating to the object that has been superseded by a predetermined number of more recent transactions relating to the object.

In an embodiment the robot is configured to autonomously determine the predetermined number based on its own system availability, e.g a remaining memory capacity.

In another embodiment the predetermined number may be provided to the robot. The predetermined number may be different for different objects, e.g. depending on a perceived importance of the object.

In an embodiment the autonomous robot is further configured to store information confirming a physical location of an object.

In an embodiment the information is deleted when the task is related to has been fully verified as having been completed.

In an embodiment the autonomous robot is further configured to synchronise a locally stored copy of the DAG with other copies of the DAG stored by another robot when within communication range of the other robot.

In an embodiment communication between robots is facilitated by a wireless network, such as a WiFi network, a Bluetooth connection or a cellular network.

In an embodiment the autonomous robot is further configured to update the locally stored ledger upon receiving a distributed ledger sync message from another robot.

According to another embodiment there is provided an administration robot for a multi-agent system comprising a plurality of autonomous robots, the administration robot configured to maintain a directed acyclic graph, hereinafter DAG, comprising a history of tasks completed by the plurality of autonomous robots and to treat a task posted to the DAG as fully verified once the administration robot has received a predetermined number of physical and cryptographic verifications of the task from autonomous robots in the system other than from a robot in the system that has posted the task to the DAG.

In an embodiment the administration robot is further configured to determine a physical and cryptographic verification to be deemed correct out of a plurality of physical and cryptographic verifications based on a consensus mechanism.

In an embodiment the administration robot is further configured to provide information of tasks previously posted to the DAG that need to be verified to a robot in the system, wherein the administration robot is configured to obtain information regarding a current location of the robot within the system and to select a task to be verified from the DAG based on a proximity of the task to be verified and the current location of the robot in the system.

According to another embodiment there is provided a method of operating a multi-agent system comprising an administrator configured to maintain a directed acyclic graph, hereinafter DAG, and a plurality of autonomous robots using asymmetric encryption for identification to at least one of the administrator other robots of the plurality of autonomous robots, the method comprising:

a robot of the plurality of autonomous robots obtaining a physical task from a dynamic task list, perform the physical task and to, upon completion of the task, append task completion information to the DAG; and another robot of the a plurality of autonomous robots, independent of the autonomous robots that has appended the completion information to the DAG, physically and cryptographically verify that a task appended to the DAG by the autonomous robot that has appended the completion information to the DAG has been completed in accordance with the completion information, wherein cryptographic verification includes checking a cryptographic identifier of the autonomous robots that has appended the completion information to the DAG.

A non-volatile storage medium comprising executable instructions suitable for execution by one or more processors in robots of a multi-agent system, the executable instructions, when executed by the one or more processors causing the robots to perform the method described above.

According to another embodiment there is provided a method of operating an autonomous robot comprising:

obtaining a physical task from a dynamic task list, performing the physical task and to, upon completion of the task, submit completion information to an administrator of the dynamic task list for appending task completion information to a DAG; and obtaining information relating to tasks appended to the DAG by other robots and, independent of the other robot, physically and cryptographically verify that a task appended to the DAG by the other robot has been completed in accordance with the information relating to tasks appended to the DAG, wherein cryptographic verification includes checking a cryptographic identifier of the other robot that has appended the completion information to the DAG.

A non-volatile storage medium comprising executable instructions suitable for execution by a robot, the executable instructions, when executed by the one or more processors causing the robot to perform the method described above.

According to another embodiment there is provided a method of operating an administration robot of a multi-agent system that comprises a plurality of autonomous robots, the method comprising:

maintaining a directed acyclic graph, hereinafter DAG, comprising a history of tasks completed by the plurality of autonomous robots, treating a task posted to the DAG as fully verified once a predetermined number of physical and cryptographic verifications of the task are received from autonomous robots in the system other than from a robot in the system that has posted the task to the DAG.

A non-volatile storage medium comprising executable instructions suitable for execution by a robot, the executable instructions, when executed by the one or more processors causing the robot to perform the method described above.

Figure 1:
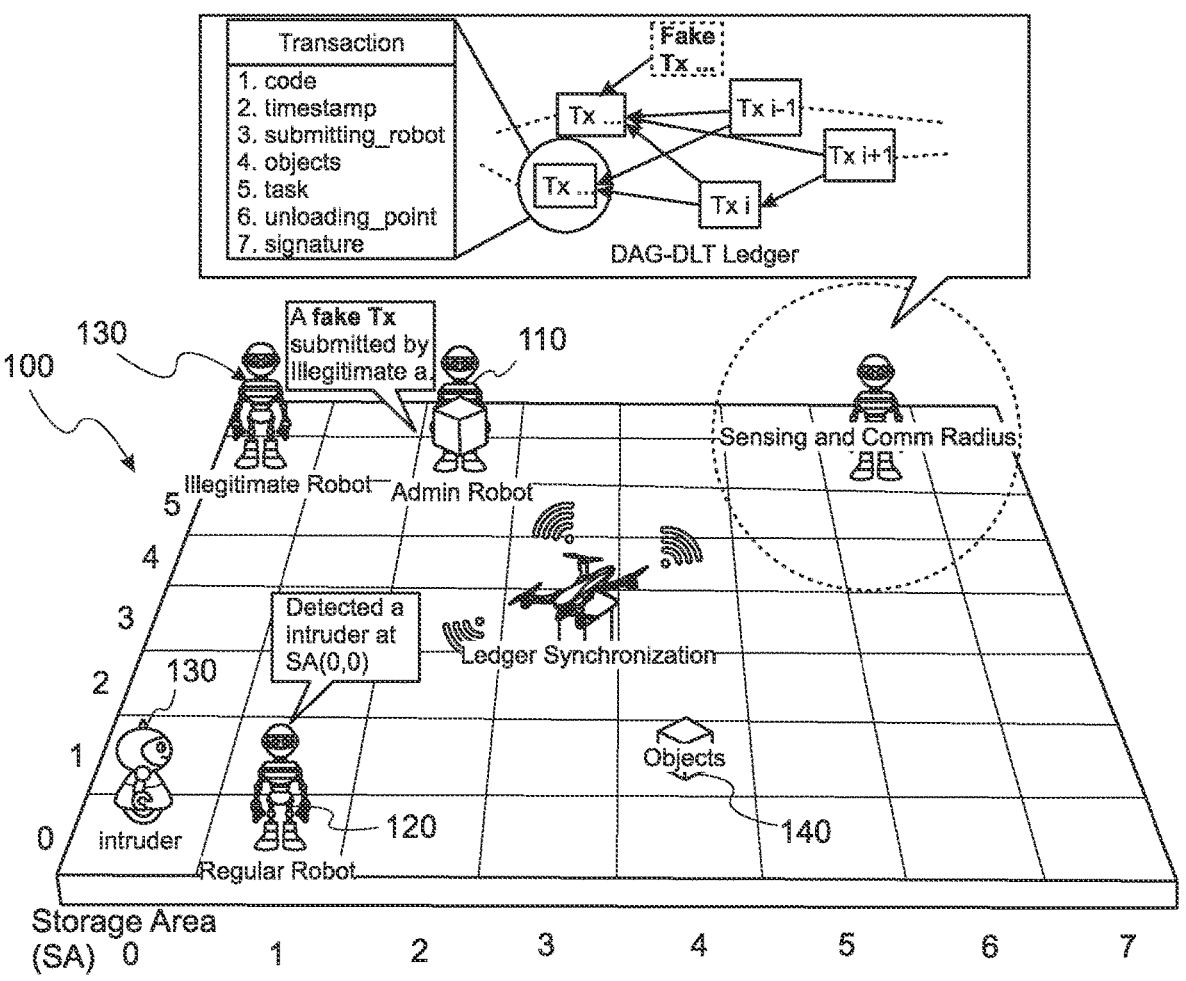
FIG. 1 shows a multi-agent system of an embodiment.

FIG. 1 shows a system 100 of an embodiment. In the embodiment the system 100 comprises an identity management system, a task management system, a distributed ledger, and an incentive system. The system 100 comprises two main types of members: admin robots 110 and regular robots 120. These robots 110/120 fulfil unmanned and autonomous inventory management tasks. However, the trustworthiness of the robots 110/120 in the system 100 cannot be guaranteed at all times, because of potential threats such as self-failure, malfunctioning, illegitimate intruders, etc. In the embodiment one or more or all of the identity management system, the task management system, the distributed ledger, and the incentive system are running on the admin robots 110 and is primarily used to manage the identities of the legitimate members of the system 100 and their public keys. The admin robot 110 updates and allocates tasks. Generally, the system 100 uses asymmetric cryptography algorithms to verify one or more of the identity of robots 110/120 and the veracity of transactions posted by robots 110/120. All regular robots 120 that join the system 100 have access to the list of tasks maintained by the admin robot 110 and the list of members in the system 100 maintained by the admin robots 110 in one embodiment. All completed tasks are posted to a distributed ledger in the form of transactions. This so the behaviors of all the robots in the system are traceable and trackable. In addition, other legitimate robots 110/120 verify the transactions in the ledger to confirm the correct completion.

The system 100 of the embodiment is compatible with homogeneous/heterogeneous multi-agent systems. This means that any robots 110/120 wanting to join the system can do so by generating a public-private key pair locally and register with the identity management system using the public key. In one embodiment the robots 110/120 are identified directly using their public keys. In an alternative embodiment a shorter identity calculated using a hashing algorithm (e.g., SHA256) is used instead.

Associated with each robot is a reputation value. The reputation value is a measure of how trustworthy the robot is considered by the system 100. In an open access environment, such as the open access environment of the embodiment, it is desirable to track the reliability of members within the system. After successful registration into the identity management system, the robot 120 is given a certain initial reputation value (e.g., 100). This reputation value is recorded in the incentive system alongside an identifier for the robot 120.

In an alternative embodiment one or more or all of the identity management system, the task management system, the distributed ledger, and the incentive system are running on a centralized system, so that admin robots 110 may not need to be provided. The task management system is responsible for task creation, updating and allocation. In an embodiment a task contains information like the source and destination of the object, weight and volume, and weight of the task (for example calculated from the properties of the objects and shipment distance). The task management system records all the inbound and outbound objects 140 with the corresponding task executors/robots 110/120.

Figure 2:
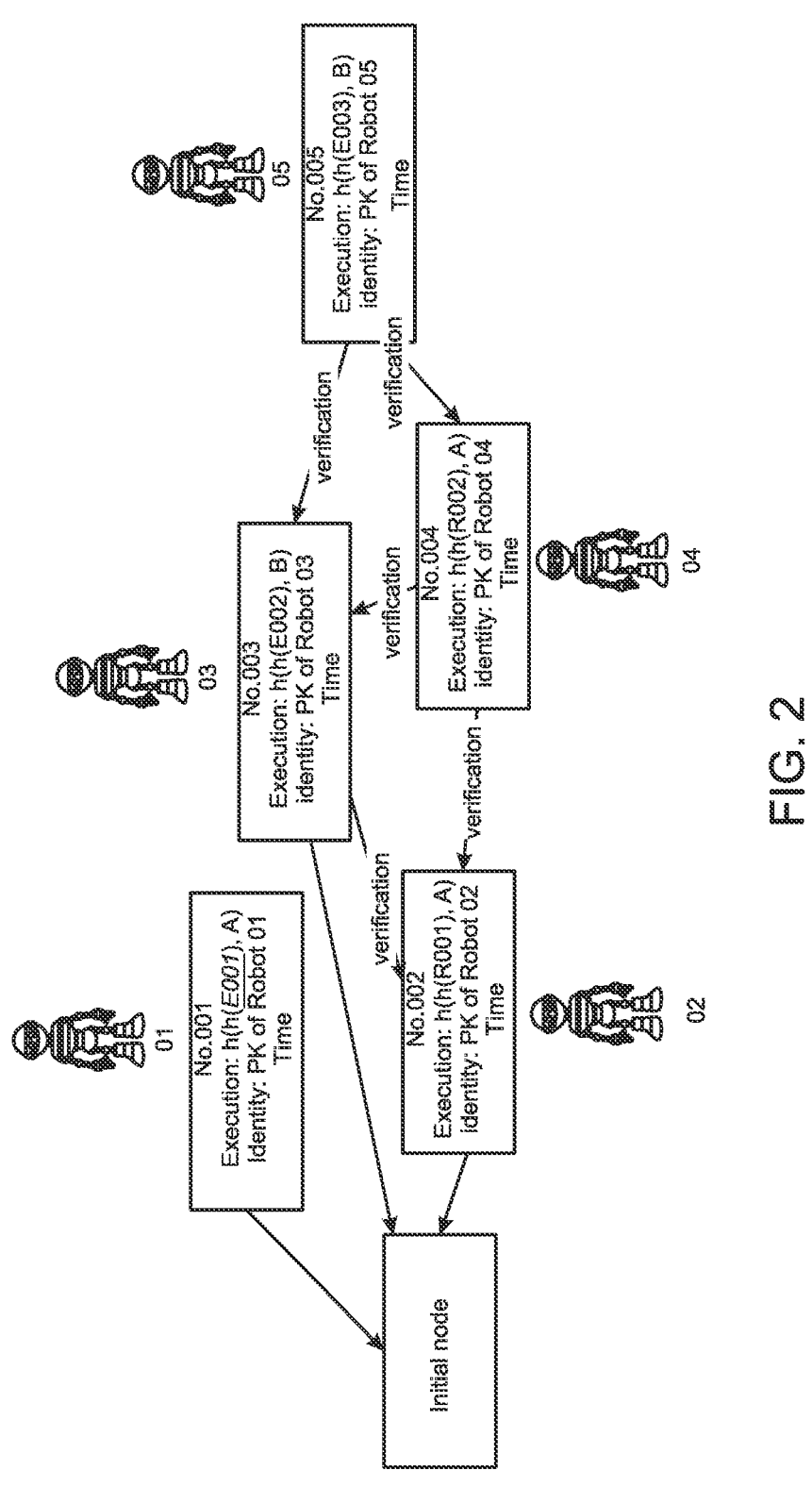
FIG. 2 shows an example of directed acyclic graph (DAG)

FIG. 2 shows an example of directed acyclic graph (DAG) recording the transactions performed by a plurality of robots 01 to 05, wherein each transaction forms a node in the DAG. The robots 01 to 05 may be robots 110/120 in the system 100 described above. The ledger and its genesis/initial node is first initialized by the admin robot 110 before the system starts running. Each robot 120 who successfully registers their identity in the system 100, in a first step after successful registration to the system, synchronizes the contents of the ledger with the admin robots 110. Each robot 120 additionally synchronizes the ledger with other robots 120 around it as it moves.

In this example, of these transactions only the transactions posted by robots 02 to 05 are valid. In the embodiment, the number (e.g. No. 002, No. 003 etc) is the index of a transaction, 'h' represents hash calculation, 'R001' is the code of the object carried by Robot2 and 'R' means an ordinary object which should be delivered to warehouse 'A' (in comparison, 'E' represents a different kind of object should be delivered to warehouse 'B'), 'PK' is the public key of a robot and the time will be the real-time a transaction is submitted at. It will be appreciated that the embodiment is not limited to use of these data and that other data or a subset of the data mentioned here may instead be recorded on the ledger. It will equally be appreciated that it is not essential that the ledger is a DAG and that instead any other suitable type of ledger may be used.

As can be seen from FIG. 2, all transaction that do not directly link to the initial/genesis node (i.e. the transactions posted by robots 04 and 05) link to more than one previous transaction. Additionally, a robot 110/120 is only permitted to post a new transaction if it has previously verified a number of previously posted transactions that corresponds to the number of transaction the robot 110/120 is required to append its own transaction to when posting its own transaction. In one embodiment, the robot 110/120 is configured to only append its own, new transactions to those previously posted transactions that the robot 110/120 has verified. In the example of FIG. 2, the predetermined number of previous transactions a robot is required to have verified before posting a new transaction is two. As described below, this predetermined number can be changed by the system 100 as required to ensure that the robots 110/120 operating in the system verify a sufficient number of transactions.

Figure 3A:
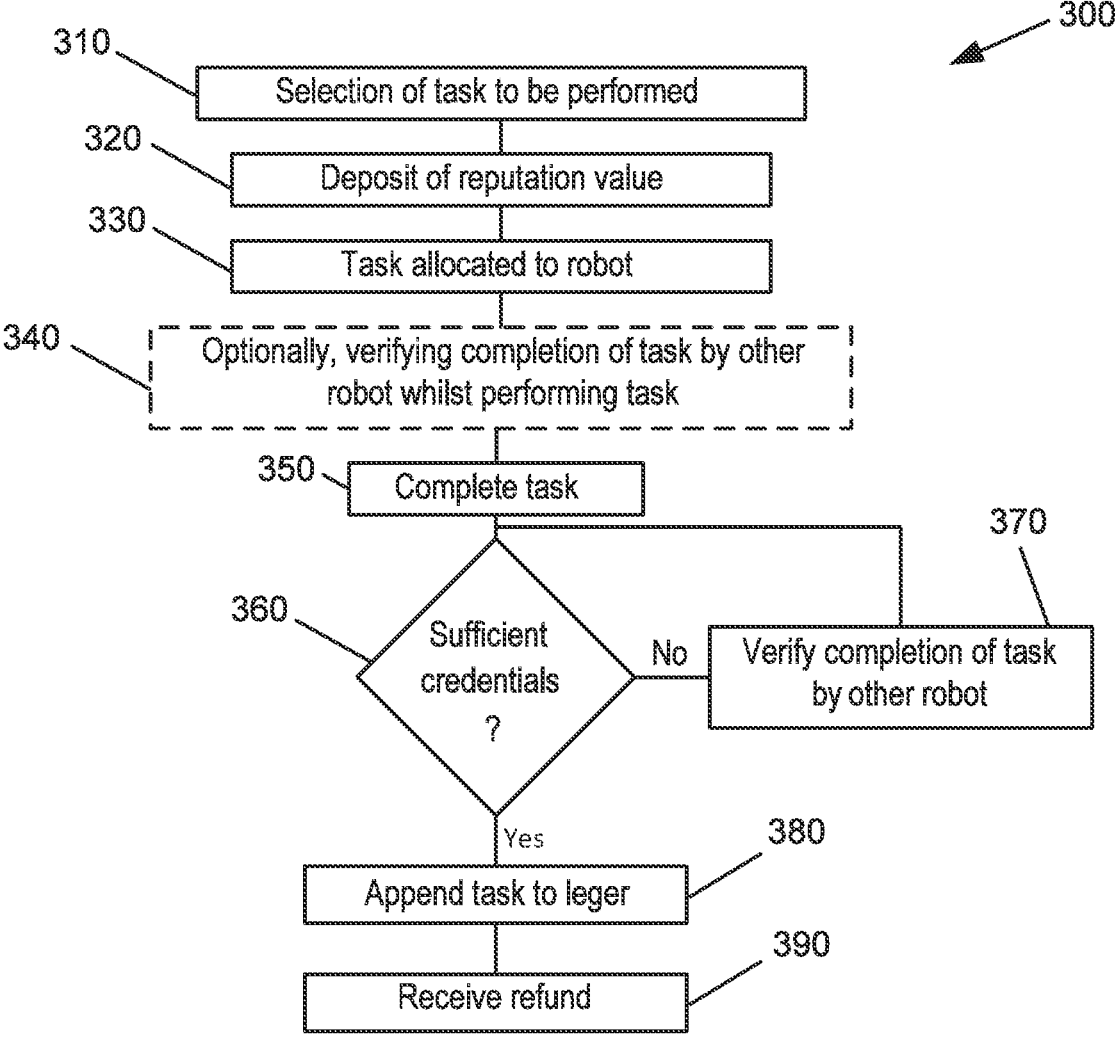
FIG. 3A shows a method of an embodiment.

FIG. 3A illustrates the steps performed by a robot 110/120 when performing a method 300 for performing a task. In a first step 310 the robot 110/120 obtains information regarding a task that is to be performed from the task management system. As shown in FIG. 2, each task has a location where the task is to be performed associated with it. For example, a transport task has a location at which an object to be transported is presently situated as well as a destination location. In an embodiment the robot 110/120 selects the task from the list of tasks maintained by the task manager that is physically closest to its current location. It will, however, be appreciated that other criteria for selecting a task may be used by the robot 110/120. In a system 100 in which robots 110/120 from different manufacturers operate, different robots 110/120 may have different technical ability. As such, in a system in which robots 110/120 preferentially chose task based on a criterion or criteria that reflect their abilities, be that because of the robot's 110/120 original configuration, such as a maximum load the robot 110/120 can lift, or because of a current operating state, such an amount of remaining battery power, the various strengths of different models of robots can be exploited.

In an embodiment the robot 110/120 is required to spend or deposit a predetermined amount of reputation (step 320) in exchange for acquiring the task. This mean that, the amount of reputation available to the robot 110/120 decreases temporarily until the acquired task has been completed and has been verified as having been completed by other robots 110/120. In an embodiment the predetermined amount of reputation that needs to be deposited by the robot 110/120 depends on the difficulty associated with performing the task, for example the weight and/or the volume of an object to be transported. In this manner robots may be incentivized to perform tasks that may be more onerous to perform than other tasks, for example because they consume a larger amount of the executing robot's resources, such as operating time and/or energy for objects that need to be transported a longer than average distance or energy for heavy objects, by assigning a lower amount of reputation that needs to be deposited to such tasks. The system 100 is nevertheless configured to prevent the reputation amount available to robots 110/120 to only slightly exceed the level of the originally assigned reputation amount to prevent a situation in which a robot that has accumulated a large amount of reputation but that is later compromised from being able to commit undesirable acts without checks. In one embodiment the system requires robots 110/120 with a large amount of stored reputation to deposit a higher amount of reputation for a task than would be required of a robot 110/120 that has accumulated a lower amount of reputation whilst returning the same amount of the deposited reputation to all robots 110/120 irrespective of the originally deposited amount. Additionally or alternatively the system 100 returns a lower amount of the deposited reputation to robots 110/120 that have accumulated a large amount of stored reputation than the amount of the deposited reputation that is returned to robots 110/120 that have accumulated a smaller amount of stored reputation.

When the robot 120 has completed the task and when the completion of the task has been verified by other robots 120, a part of the spent/deposited, predetermined amount reputation is refunded to the robot 120 that has completed the task. In an embodiment the refunded amount is 80% of the reputation amount initially invested by the robot 120. The remaining part of the initially invested reputation amount is rewarded equally to those robots 120 that have verified completion of the task. This reputation-based incentive system makes the reliability of each robot transparent.

More generally, the amount of reputation required to be deposited by the robot 110/120 is predetermined by the system 100. Preferably, a significant fraction of the amount of reputation initially allocated to each robot 110/120 is required to be deposited by each robot 110/120/for each individual task, so that the number of tasks a robot 110/120 can acquire before completing and posting a task is limited to a small number, preferably to a single or to two tasks only. In one embodiment the system 100 sets a predetermined number of tasks each robot is allowed to hold at any given time and sets the amount of reputation required to be deposited to an amount that corresponds to the initial reputation amount attributed to the robot, divided by the predetermined number of tasks. Alternatively, the system 100 sets the amount of reputation required to be deposited to a large fraction, for example 80% or 90% but not all of this amount. In an embodiment the predetermined number of tasks that a robot 110/120 can hold at any one time is one, two or three tasks.

If the robot 110/120 does not have sufficient reputation recorded by the reputation management system, then the robot 110/120 cannot acquire a task from the task management system. As discussed further below, it is possible for robots 110/120 to acquire reputation by verifying the accurate completion of the transaction performed by other robots 110/120. Requiring the robot 110/120 to deposit an amount of reputation prevents a situation in which a robot 110/120 erroneously or even maliciously acquires a large number of transactions without intention to complete these transactions.

Once the robot 110/120 has deposited the required amount of reputation the task is allocated to the robot 110/120 by the task allocation system in step 330. To do so, the task allocation system notes the ID of the robot against the task. In this manner the task is marked as being performed by the identified robot and will not be allocated to any other robot.

Once a predetermined/required number of other robots 110/120 have verified that the task performed by the robot 110/120 has been verified in the manner posted on the ledger by the task completing robot 110/120, the robot 110/120 receives a partial refund of the reputation invested when acquiring the task. To enable verification and to receive this refund, the robot 110/120 needs to append the task in the distributed ledger. The number of previously completed tasks to which the robot 110/120 has to append its own completed task is determined by the system 100. The robot

110/120 needs to acquire and spend a credential for each task to which it appends its own completed task. Credentials can be obtained by verifying that tasks previously added to the distributed ledger by other robots 110/120 have been completed in a required fashion. This can be done in the manner described in more detail below and may be done by the robot 110/120 when travelling to a starting point of the tasks allocated to the robot 110/120 in step 330, whilst the robot 110/120 travels during task completion of following completion of a task by the robot 110/120. In one embodiment the task comprises transporting an object from one location to another location. The robot 110/120 may therefore verify the completion of tasks by other robots 110/120 either on the way to picking up the object that is the subject of its own tasks, during delivery of the object to the destination location or indeed following depositing of the object at the destination location.

Once the task has been completed in step 350, the robot 110/120 generates a transaction at the unloading point to record information about the task executed (e.g., object information, performer identity, timestamp, unloading point). The robot 110/120 then digitally signs the task execution-related information with its private key and checks in step 360 if they have sufficient credentials for appending the completed task to the ledger. Should this not be the case, then the robot 110/120 will proceed to verify the completion of tasks performed by other robots 110/120. Once sufficient credentials have been acquired by the robot 110/120 the robot appends the task to the ledger in step 380 as illustrated in FIG. 2. Once the required number of other robots 110/120 have verified the new transaction, the robot 110/120 that has appended the tasks to the ledger receives a partial refund of the reputation deposited in step 320. It will be appreciated that there can be a delay between appending a task and received the reputation refund. During this delay robots 110/120 waiting for their refund are free to perform other tasks if they have other acquired tasks that are to be done or have sufficient remaining reputation to acquire a further task. Alternatively, the waiting robot may verify other tasks in the DAG that need to be verified. In one embodiment, the robot 110/120 appends its own task only to those previous tasks in the ledger that have been verified by the robot 110/120. In one embodiment the directed acyclic graph (DAG) transactions are appended to and verified in uses the IOTA value transfer protocol.

Figure 3B:
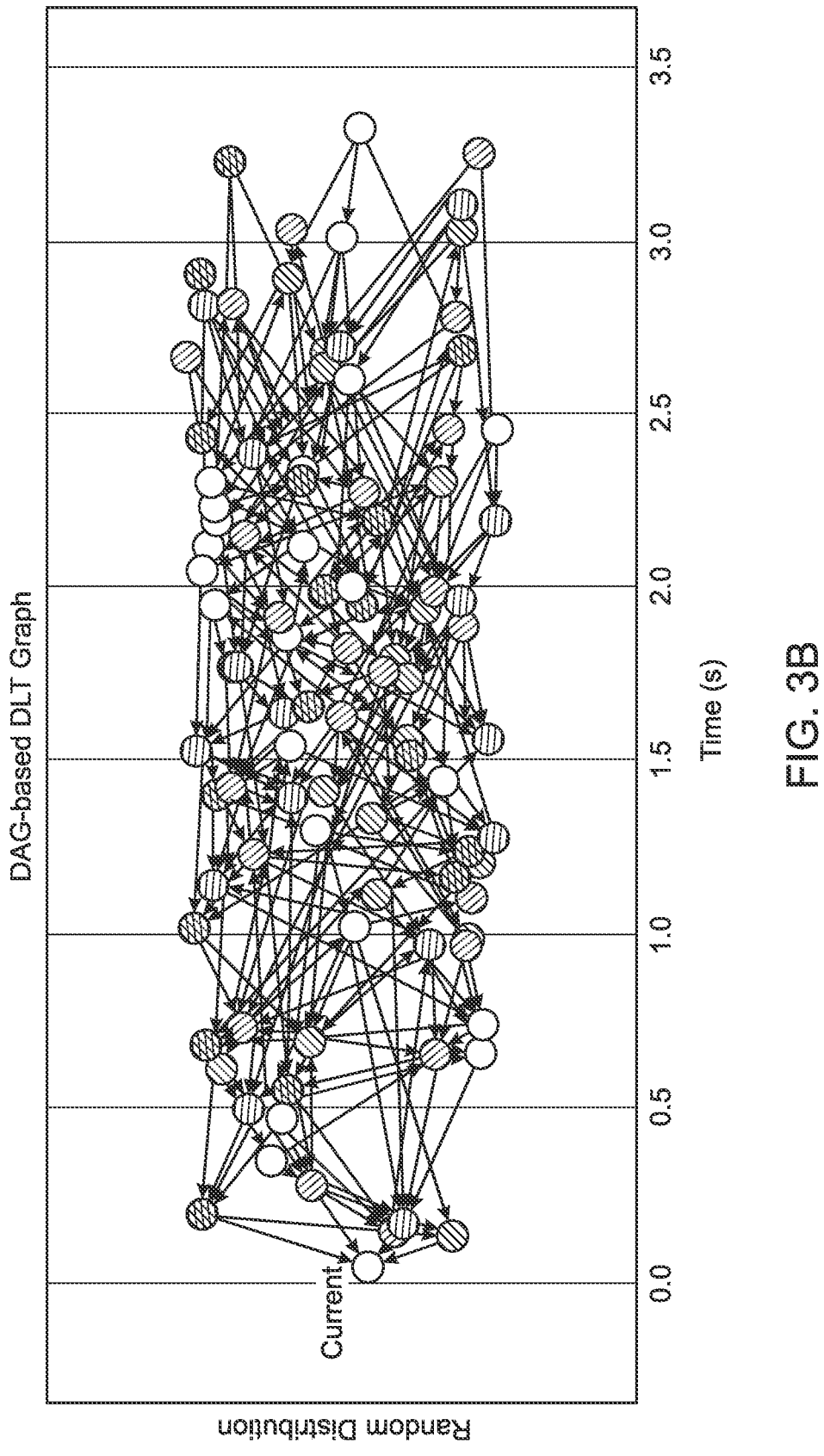
FIG. 3B shows a graphical illustration of a distributed ledger.

FIG. 3B shows a graphical illustration of a distributed ledger generated in a simulated warehouse environment comprising 6×6 storage locations. The simulation covers 100 tasks in which objects have been moved within the warehouse. Five robots are simulated as being available for performing these tasks, wherein the sensing radius for each robot is one storage location large. The number of robots in a simulation and their sensing and communication range is individually adjustable, which facilitates comparative experiments. In one embodiment all of the parameters of a robot are set during the robot's initialisation within the system, with transaction and task parameters been provided to robots 110/120 during system operation. All the robots 110/120 in the system 100 are independent in terms of task acquisition, task execution and transaction submission.

Transaction nodes in the graph are distributed in chronological order of submission to the ledger on the x-axis. In the simulation each transaction is considered fully/suitably verified if four robots have indicated that the transaction is correct/four robots have independently verified the transaction. It is inevitable that at every stage of the evolution of a distributed ledger some of the transactions have not been verified the predetermined number of times (four verifications in this example) required for them to be considered fully verified. Such transactions can be seen in the example illustrated in FIG. 3B and may be considered 'tips' in the distributed ledger. The number of such tips/not fully verified transactions provides a useful indication of the timeliness of verification of transactions within the system or, more generally, of the system's efficiency. The Genesis node, that is the leftmost node in FIG. 3B, is initialized by the system 100 in the distributed ledger during system set up. As directly after the generation of the genesis node there are no transactions that robots 110/120 can verify, the robots 110/120 cannot earn credentials required for posting transactions to the ledger. In an embodiment the system 100 is configured to allow robots 110/120 to post transactions to the genesis node of the ledger without providing credentials and/or to append transactions to those nodes/transactions in the ledger directly linked to the genesis node at a reduced credential cost, if the number of transactions available for verification is below the number of reduced credentials. In an alternative embodiment, the system 100 is configured to dynamically adjust/reduce the number of credentials required for allowing the posting of a transaction to the ledger from a predetermined number (four in this example) to be equal to or less than the number of transactions available for verification/the number of credentials that can be earned by the robot 110/120.

Figure 4:
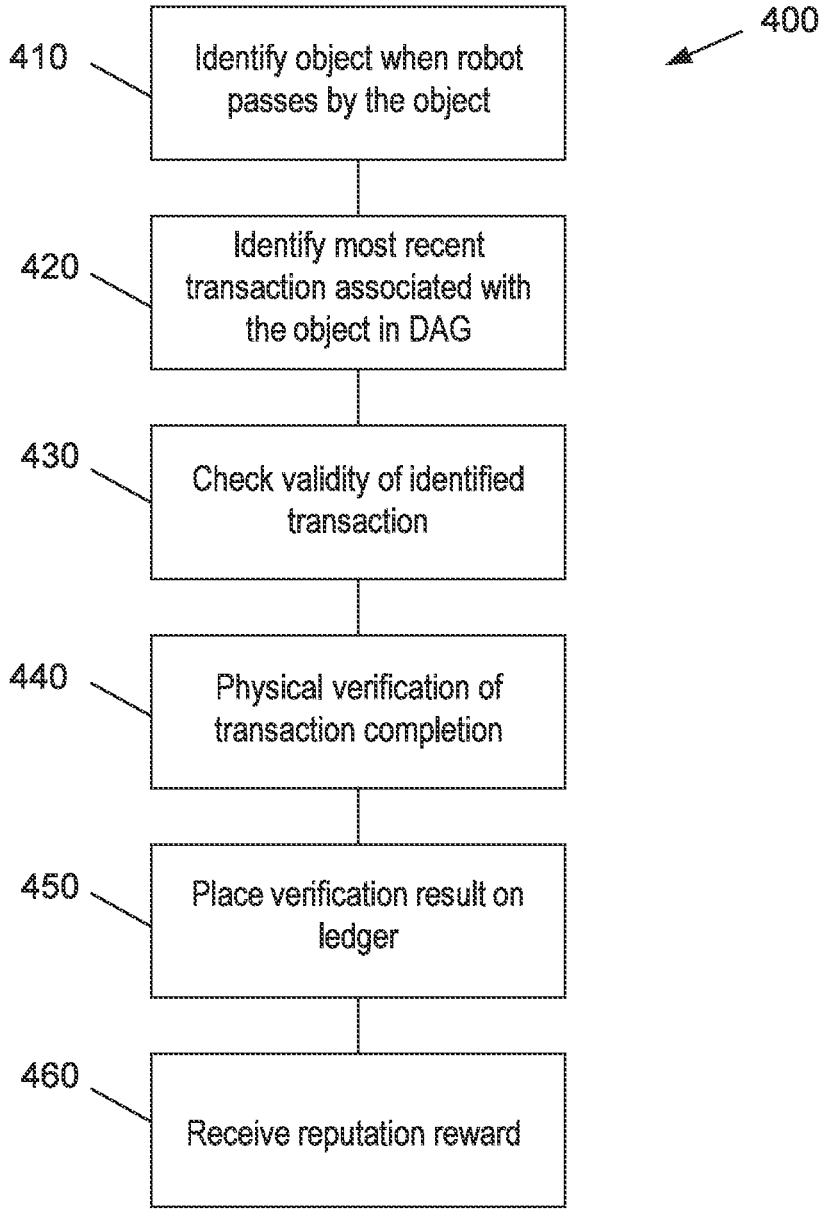
FIG. 4 shows a method performed by a robot in an embodiment.

FIG. 4 illustrates a method 400 that, in one embodiment, is performed by a robot 110/120 verifying a transaction performed by another robot 110/120. All robots 110/120 continuously identify transactions submitted to the ledger within their current sensory range as they move and perform pass-by verification of these transactions. As the robots 110/120 perform the verification function alongside their other duties, the additional resource overhead incurred for verification is small. In the embodiment the robot 110/120 verifies transactions that are associated with objects that the robot 110/120 passes during the performance of their tasks.

Each robot 110/120 is configured to identify objects as they are passed. For this purpose, the robot 110/120 includes sensors for identifying objects. These may include cameras for acquiring images of objects and associated hardware configured to perform automated identification, thereby identifying the object but may additionally or alternatively include technologically more specific devices for identifying object, such as a barcode scanner configured to scan a barcode associated with/applied to an object 140 to be identified or a RFID reader configured to read a RFID tag associated with/applied to the object 140. In one embodiment the robot 110/120 moves according to the shortest distance to the destination (for example the Manhattan distance in the simulation platform discussed below) when executing a task. Once the object 140 has been identified, the identifying robot 110/120 investigates (step 420) its local copy of the ledger to identify the most recent transaction posted on the ledger relating to the object 140. In an embodiment the robot 110/120 obtains the name/identity information of the object 140 and then initially identifies the object 140 and investigates the ledger using the obtained name/identity information of the object 140.

If the number of verifications of the task provided by other robots is below the number required by the system 100 configuration, then, in step 430, the robot 110/120 verifies that the task posted on the ledger has been posted correctly (in one embodiment this is done by checking the transaction's signature via the submitter's public key and hash value).

In the case of a valid transaction, the robot 110/120 checks in step 440 that the object currently occupies the correct destination location as stated in the ledger. To this end the robot 110/120 uses its onboard sensors to scan whether the corresponding object is in the unloading point recorded within the transaction on the ledger. During the scanning process, the robot 110/120 stores the generated proof of location information locally for subsequent auditing by the admin robots 110. If the location information detected by the robot 110/120 matches the location information recorded with the transaction, the verification of the transaction is completed. Once a transaction has been verified by the required number of verifying robots 110/120, each verifying robot 110/120 is provided with a predetermined fraction of the reputation amount invested by the robot 110/120 that has conducted the transaction.

If different verifying robots 110/120 generate different verification results for the same transaction, an admin robot 110 acts as a central coordinator to review the transaction with the help of points of location stored in the verifying robots' 110/120 local storage to reach a final consensus.

If there is a mismatch between the real location of the object 140 and the unloading point recorded in the transaction or if the signature of the transaction is invalid the robot 110/120 report an error to the admin robot 110. As each robot 110/120 is required to identify itself using its public key when posting a transaction, the robot 110/120 that has posted an incorrect transaction can easily be identified by the robot 110/120 attempting to verify the transaction. The robot 110/120 that has attempted to verify the transaction broadcasts the identity of the submitter of the corresponding transaction to the entire system 100 to allow locating the malicious robot 130. An identified malicious robot 130 will not a receive a refund of the reputation invested when accepting a task, thus limiting or eliminating the robot's ability to accept further tasks.

Once the robot 110/120 has verified the cryptographic and physical correctness of the posted task, the robot 110/120 posts the positive verification result to the ledger and, once all required verifications have taken place, receives the pre-agreed reputation reward as well as a credential for the later posting of its own transaction on the ledger for posting the verification on the ledger in step 450. In one embodiment the robot 110/120 stores the location and verification information generated locally within its own memory and without transmitting the entirety of the data to the ledger. In this way transmission overheads are minimized as merely a confirmation that verification has been success is submitted to the ledger. Should the verification later need to be audited then any such audit is initiated by requesting the all or a larger part of the verification data stored in the robot 110/2120 to an auditing entity, such as to an administrator 110. In one embodiment the verification information includes images of the object in question acquired by the robot 110/120 in addition to a time stamp of the time of acquisition of the verification information. The system 100 is configured to only accept one validation per robot 110/120 of any given transaction. As part of the verification process, the identity of the verifying robot 110/120 is added to the record of the transaction on the distributed ledger.

If the number of robots 110/120 that have posted a positive verification of a task on the ledger corresponds to the number of required verifications then the robot 110/120 who has posted the task on the ledger receives the pre-agreed partial refund of the reputation deposited in step 320. The part of the reputation value that is not refunded to the robot that has performed the task is given to the predetermined numbers of required verifiers in equal parts. This also means that for tasks that have been posted maliciously and that cannot therefore be verified the entire initially deposited amount is available for distribution in equal parts to the verifying robots 110/120. It will be appreciated that, if a robot 110/120 has verified a transaction but may not have been able to post the verification (for example because it was out of communication range) then the verification may be posted too late for the verifying robot to receive a reward for verifying the transaction.

As mentioned above, a robot 110/120 can only post a task on the ledger if the robot 110/120 possesses the number of credentials specified by the system requirements. The number of credentials required by the robot 110/120 to submit a transaction is proportional to the number of transactions currently in the distributed ledger that still need to be verified and to the number of credentials stored locally by the robot 110/120. The system can change the number of credentials required for this purpose. In one embodiment the robot 110/120 determines the number of credentials (No. Credential needed) it still needs to acquire before it is able to post a transaction to the ledger by:

$$No.Credential_{needed} = \frac{(No.Tips_{realtime} + No.Credentials_{local})}{Divisor} + Base \quad (1)$$

wherein No. Tips$_{realtime}$ represents the number of currently not fully verified transactions in the ledger. In one embodiment No. Tips$_{realtime}$ does not include those transactions that, whilst still not fully verified by the required number of required robots 110/120, have already been verified by the robot 110/120 seeking to post its own transaction. As such, in the embodiment, No. Tips$_{realtime}$ represents the number of transactions the robot 110/120 seeking to post its own transaction can select from when seeking to obtain further credentials.

In an alternative arrangement, No. Tips$_{realtime}$ represents the number of individual verifications still required to be posted to the system for all transactions to be fully verified. In the embodiment No. Tips$_{realtime}$ therefore represents a system requirement instead of representing the number of verification opportunities open to the robot 110/120 seeking to post its own transaction.

No. Credentials$_{local}$ represents the number of credentials the robot 110/120 has already obtained at the time the robot 110/120 determines how many further credentials No. Credential$_{needed}$ are needed before a new transaction can be posted.

Divisor and Base are system variables that are the same for all robots 110/120 and that are adjusted by the system 100 from time to time to ensure that the robots 110/120 registered to the system to balance the system requirement of having all outstanding verifications completed in a timely manner without depriving robots of access to the number of outstanding verifications that they need to post future transactions. Base can be adjusted by the system 100 or its operator to increase the number of transaction verifications a robot needs to perform to be allowed to append its own transaction to the distributed ledger. Divisor can be adjusted by the system 100 or its operator to influence the timeliness of the transaction verification. The smaller the Divisor, the more credentials a robot 110/120 needs to acquire. This, in turn, forces robots 110/120 to verify existing transactions more readily, thereby increasing the verification speed of the system.

It will be appreciated that this formula allows for dynamic adjustment of the number of credentials each robot 110/120 needs before they can attach a transaction to the distributed ledger. This allows to control the number of not fully verified transactions that remain in the ledger over time. In an embodiment this number is 20 or lower. Simulation have shown that, with 10 robots deployed in a 10*10 warehouse (that is a warehouse that has a 10×10 grid of possible storage locations), with Divisor set to 10 and Base set to 2, and the number of times each transaction needs to be verified set to 4, the number of transactions that need to be verified in the distributed ledger will never exceed 20.

Each robot 110/120 is equipped with one or more sensors to detect other robots 110/120/130. Each robot 110/120 is moreover configured to identify other robots 130 that are not registered with the system 100. In one embodiment a pre-trained computer vision models is deployed within each robot 110/120 to detect robots 130 that are not a member of the system 100. Malicious robot detection function always runs in the background after the robot 110/120 is started and constantly scan the environment as it moves.

The robot 110/120 reports the location of the intruder 130 and the time of detection to the admin robots 110 as soon as it detects one illegitimate intruder 130, as well as confirm whether it is carrying an object 140 and record information about the object 140. Since intruders 130 can randomly place items in the wrong storage area, this can disturb the legitimate robot 110/120 from finding an object 140 at the location denoted in tasks. If such problems happen, the legitimate robot 110/120 reports to the admin robots 110 that it cannot locate the object that needs to be delivered. The admin robot 110 then disseminates the object's 140 information to all robots 110/120 in the system and asks them to assist in locating the object 140 as they move. Once the object 140 is found, the admin robot 110/120 re-creates a delivery task for the object 140 in the task management system to allow other robots to deliver it.

Whilst in one embodiment robots 110/120 select tasks to be verified based on a current proximity to objects relating to the task, in another embodiment alternatively or additionally the admin robot 110 maintains an indication of verification priority and communicates the priority of tasks to be verified to robots 110/120 in communicative contact with the admin robot 110. In this manner tasks that need to be verified expediently, for example because an object associated with the task is to be made subject of another task, can be prioritized so that full verification is achieved quickly and so that the next task related to the object can commence.

As discussed above, the system 100 may include an admin robot 110. Alternatively, the responsibilities of the admin robot 110 may be taken over by a centralised control function. In situations where admin robots 110 are present, the system 100 may be configured to have either a single admin robot 110, multiple admin robots 110 or a structure in which all robots are admin robot 110.

In the single admin robot 110 scenario, the admin robot 110 initializes all the management systems (e.g., identity, tasks, ledger, reputation). In this scenario regular robots 120 enroll into the identity system to perform tasks via the identity registration process. After successful identity registration, the regular robots 120 synchronize the distributed ledger with the admin robot 110 in real time while moving. At the same time, the regular robots 120 are permitted to access the task list and the identity list of the system members maintained by the admin robot 120. All robots 120 synchronize data with other robots 120 in their communication range during task execution (for example, in a lowpower mesh network, such as bluetooth), including the distributed ledger, task list, and member list. If there are disagreements between the data stored locally by different regular robots, the data maintained by the admin robot takes precedence for synchronization.

In a scenario where multiple admin robots 110 are present, the multiple admin robots 110 work together to initialize all the management systems. Regular robots 120 are still required to register with the system 100 via identity registration. For this purpose, you the regular robots 120 only need to interact with one of the admin robots 110. After successful registration, the regular robot 120 can access the data (e.g., task list, distributed ledger, and member list) maintained by the admin robots 110. Multiple admin robots 110 periodically synchronize to avoid disagreements during the system's runtime. In the event of a disagreement, all admin robots 110 are configured to be coordinated through a consensus mechanism to ensure data consistency. In one embodiment the consensus mechanism uses majority voting rules to eliminate disagreements.

In a third scenario, all of the robots are admin robots 110. In this scenario, all robots have access to all management system (e.g., tasks, identities, distributed ledger). The admin robot 110 are, again, configured to coordinate through a consensus mechanism to avoid disagreement in the data managed.

In one embodiment communication between members 110/120 of the system 100 is facilitated using an infrastructure based network, such as a Wi-Fi or private cellular networks. Infrastructure based networks provide a reliable, fully connected network. The robots can to remain connected and update local data during task execution based on a large number of pre-deployed network devices (e.g., access points or base stations) in the environment. Use of an infrastructure based network allows the system 100 to eliminate disagreements between robots promptly.

In another embodiment the system 100 relies on a lower cost infrastructure-less mesh network, such as a network relying on bluetooth. In this network, the robots in the system 100 implement a fully connected network via relays. However, this connection is not completely reliable. If the task execution environment is large enough, individual robots 110/120 can become disconnected from a group of other robots 110/120 and thus unable to synchronize data with other robots 110/120 for a while. If this problem exists for multiple robots 110/120 simultaneously, multiple disagreements are likely to arise in the system. For example, if in a given system, a transaction is required to be verified by a certain number of robots 120 (e.g., 4) but multiple robots 110/120 are out of the communication range and unable to synchronize data for a while, a transaction may be verified more times than the specified number. In the embodiment, the verification reward for the transaction is distributed equally to all verifiers to ensure fairness.

One source of disagreement that may arise during task execution is if a robot 110/120 is out of the communication range of all the other robots 110/120 and executes a task from the task list but cannot synchronize data with other robots 110/120 in time. If other robots 110/120 attempt to perform the task cannot find the corresponding object they will report an exception. As a consequence, the admin robots 110 label the task status as an exception, which will be corrected when the robot 120 that has executed the task synchronizes its data with the other robots 110/120.

FIG. 5 provides another illustration of the method 500 in which a robot 120 (referred to in the figure as agent) interacts with the ledger and other robots 120 (refer to the figure as other agents). The solid line in the middle of FIG. 5 relates to primary work steps of a robot, the dashed line to the left shows the background process of a robot, and the solid line on the right side demonstrates the work processes of other robots in the system. The robots 120 synchronise 510 the versions of the ledger stored locally by the individual robots 120. This synchronisation happens at predetermined intervals in one embodiment. In another embodiment each robot 120 is configured to initialise synchronization in situations where it has made a change to the locally stored version of the ledger since the last time it has synchronised the ledger either with another robot 120 or with an admin robot 110. In yet another embodiment robots 120 synchronise their locally stored ledgers whenever they enter into each other's communication range. It will be appreciated that other embodiments combine these triggers for synchronisation.

Equally, the robot 120 synchronises 520 their locally stored ledger with the ledger stored by the admin robot 110. This may take the form of posting transactions (step 380 in FIG. 3) or verifying 530 (step 450 in FIG. 4) the correctness of transactions posted by the robots 120. The robots 120 also receive credential for verifying transactions posted by other robots 120 when synchronising their ledger with the admin robot 110.

Aside from times at which the robot 120 either synchronises to our robots 120 or to the admin robot 110 or where the robot 120 verifiers the identity of another robot 120/130 or the completion of a task performed by another robot 120 each robot 120 works autonomously, for example in the methods discussed above with reference to FIGS. 3 and 4, including but not limited to steps 350, 380 and 540 is shown in FIG. 5. Also shown in FIG. 5 is the step of generating the transaction prior to posting. In one embodiment the transaction is generated in conformity with what is shown in FIG. 2, namely by generating a hash of data relating to the origin and destination of the object a transaction identifier and an identifier of the object. In one embodiment, as shown in FIG. 2 the data relating to the type of object and the transaction identifier may itself be a hash value of the type of object and the transaction identifier. The transaction moreover comprises a data identifying the robot that has completed the transaction as well as the time of completion.

As discussed above, robots 110/120 are identified through their public key. Put more generally, in embodiments robots 110/120 can be identified through use of asymmetric cryptographic algorithms. Given the large number of robots 110/120 performing tasks in full autonomy requires extensive data sharing and task collaboration. To enable this, it needs to be ensured that each robot in the Multi-Agent System is reliable and that their behaviour is traceable. It is further necessary for an individual robot 110/120 in a Multi-Agent System to determine whether the other robots are legitimate entities before interacting with them. Technology such as asymmetric cryptography can provide identity authentication and integrity verification to robots in a Multi-Agent System. It is known that the security provided by asymmetric encryption increases with the length of the key used. However, it is possible that an edge device does not possess sufficient computational facility to handle keys of the desired length. Consequently, Elliptic Curve Cryptography (ECC) is used in an embodiment for generating the encryptions necessary in producing and posting transactions on the distributed ledger. ECC algorithms are less computationally demanding than traditional asymmetric encryption algorithms while maintaining the same level of data encryption. A preferred algorithm used in an embodiment is the elliptic curve digital signature algorithm (ECDSA) or the Rivest Shamir Adleman (RSA) algorithm.

Each robot 110/120 is equipped with a sensor or sensors for detecting other robots and in particular 110/120 for identifying malicious robots or illegitimate intruders. For intruders, each robot in the system 100 is equipped with onboard sensors (e.g., a camera) to detect robots within a certain its sensory range (e.g. calculated in Chebyshev distance, can be defined by the user) that do not have a legitimate identity and report back to the admin robots 110 in real time. For detecting robots 130 in the system that do not have a legitimate identity computer vision (e.g., cameras with pre-trained model or QR code) is used in one embodiment. In another embodiment wireless communication (e.g., Bluetooth) is used. In yet another embodiment both technologies are used. Whilst a legitimate robot manipulated by an attacker may not be detected in time by such onboard sensors attempts to disrupt the normal operation of the system 100 (e.g., by dispatching items to the wrong destination but indicating in a transaction submitted to the distributed ledger that the items were dispatched to the correct destination) can quickly be detected by the location based verification described above and the compromised robot 130 identified through the signature used when posting the transaction.

Whilst the description of the system 100 thus far focused on a warehousing arrangement, in another embodiment the robots 110/120 are vehicles that are already equipped with a range of sensors, for example cameras. As described above, the robots 110/120 again have to register with the system. The proof of location framework and methods disclosed herein enable the transparent and secure tracking of assets such as other robots/vehicles and/or objects in environments. Even if a transaction content of alternative use cases differs, the location information verification method disclosed herein is allows reliable capture and record by means of invariant features of assets/objects in an environment.

FIG. 6 shows a simulation of a warehouse scenario with 8×8 storage places in which six robots operate. Whilst the warehouse in this example is simulated as a two-dimensional plane consisting of several individual storage areas it will be appreciated that, in other embodiments, the warehouse environment may include a plurality of such two-dimensional planes. Each storage area is associated with a unique code (e.g., SA01 means its coordinate is (0,1)) to refer to its location. Each plane contains an objects management system to record objects' inbound and outbound records. In one embodiment the object management system includes the above described task management system that records the robots 110/120 that have executed tasks associated with the object 140. In other embodiments the object management system and the task management system as separate systems that communication with each other. The object management system of each storage area maintains objects accessing logs and an object list to assist in task allocation and creation. The number of objects in a storage area are shown in the warehouse map during the simulation, as illustrated in FIG. 6.

FIG. 7 shows an example of an initialisation of system 100 during setup or during its simulation. In an embodiment the system 100 will first initialize the warehouse with a customized warehouse size. Put in other words, the system 100 will create a data structure that allows storage of data specific to each storage area within the warehouse. The warehouse size is defined by two values (e.g., x and y) to denote the number of storage areas in each dimension. Thereafter or in parallel the identity management system is initialised. In an embodiment there are two lists maintained by the identity system 100 to store the legitimate robots 110/120 (in the robot list) and malicious robots 130 (on the blacklist) in the warehouse. Robots 110/120 generate a pair of keys (e.g., the public and private keys) first and use the public key to register their identity with to the identity system. After successful registration, the robot's 110/120 identity is added to the legitimate robots list, so the robot 110/120 can access the task list and synchronize the distributed ledger with admin robots 110 later.

The task management system records the identity of executing robots 110/120 and timestamps when a task has been allocated and/or finished to make the task executions of robots traceable. The distributed ledger are also initialized at system start up.

Once all the management systems have been initialised, the robots 110/120 start their own initialisation processes. The robot's operation and identify are governed by a plurality of parameter, some of which are listed in the box shown in FIG. 7. When initialising the robot 110/120 some or all of these parameters are initialised. It will be appreciated that some of these parameters, for example the tasks parameter, will be initialised to zero until such time that the operation of the robot 110/120 makes use of the parameter. After robots 110/120 have completed the initialisation process, each robot 110/120 starts task execution, as shown in FIG. 7.

FIG. 8 categorizes five attacks that can be carried out through fake identities. Four categories of attacks have been re-defined in the following by analysing possible scenarios in a smart warehouse scenario, some of which may be a combination of multiple attacks. For each attack scenario, the attack processes is analysed and the solution to them provided by embodiments discussed.

Identity Impersonation and Repudiation Attack

In embodiments, each robot 120 uses a unique identity to join the system 100 before performing its tasks. Since the identity system is based on asymmetric cryptography algorithms, any robot 110/120 can access the identity information and the public key of other robots 110/120. However, all the transactions in a distributed ledger are digitally signed. This means that a malicious robot 130 cannot use a legitimate robot's 110/120 identity information. For example, suppose a malicious robot 130 observes that a legitimate robot 110/120 has successfully delivered an item to the corresponding destination. In that case, the malicious robot 130 can use the observed information to submit a fake transaction (fake message) to the distributed ledger (as depicted in FIG. 9A). Since each transaction has a signature generated using the private key, the fake transaction can be easily verified and exposed by other robots 120, for example through the cryptographical methods described herein. Conversely, if a malicious robot 130 has signed a transaction using its private key and denies that it submitted the transaction, the identity of the signing robot 130 can be verified using the robot's 130 public key due to the non-repudiation nature of digital signatures.

Illegitimate Intruder

In embodiments each robot 120 participating in task execution must have a legitimate identity registered with admin robots 110. Otherwise, it will be considered a illegitimate intruder/fake agent 130. Since some tasks or systems 100 requires a large number of robots 120 with different functions to work together, it is important to manage the identity of each robot 120. Suppose a robot 130 already in a warehouse does not have a legitimate identity. It can move around the warehouse and deliver items to a wrong storage area (as depicted in FIG. 9B). In this case, the items to be moved by a legitimate robot 120 may be unloaded to another storage area, causing the robot 120 to fail its task. If an illegitimate intruder 130 were to carry out a large number of random item movements, this would severely impact the efficiency of the multi agent system and eventually lead to complete downtime. In embodiments the intruder detection function for robots in a multi agent system described herein is used to prevent this attack. All the robots in the warehouse without a legitimate identity will be regarded as illegitimate intruders 130. If a robot 120 detects an illegitimate intruder 130, it will immediately report the relevant information (e.g., identity and location of the malicious robot) to one or more admin robots 110.

Intra-Fraud

Intra-fraud is another attack that can severely affect the efficiency of a multi agent system. If a legitimate robot 120 was physically captured, manipulated, and re-introduced into a warehouse by an attacker an intra-fraud attack could occur. As the robot has a legitimate identity registered to admin robots, it could obtain tasks from the task list and partially execute them (e.g., randomly unloading objects into a storage area in the middle of a delivery (as depicted in FIG. 9C). It can then generate a transaction and tamper with the unloading location of the object to complete the attack on the system. The physical (proof-of-location) and cryptographic task execution verification procedure of embodiments requires successive verifying robots 120 to sense the actual location of an object and compare it with the relevant information in the distributed ledger. If the information on the ledger does not match the physical location determined by the verifying robot 120, the verifying robot 120 reports to admin robots 110 an alert with the location of the object and the identity of the transaction submitter. The admin robots 110 then uses the verification results of multiple robots 120 to identify a manipulated robot as such and intercept it in time.

Sybil Attacks

Sybil attack is a kind of attack that exists in distributed ledger technology, which can severely impact the efficiency of the ledger. In Sybil attacks an attacker tries to subvert the distributed ledger by creating many virtual robot identities (i.e., fake agents) and registering them to the identity management system. In this way, the attacker can submit a large number of fake transactions using the fake identities without performing the tasks (as depicted in FIG. 9D). Since the legitimate robots in a multi agent system of embodiments need to verify all the transactions recorded in the distributed ledger, their efficiency will increasingly be affected by the verification processes with an increasing number of invalid transactions. To prevent the Sybil attack, embodiments integrate the reputation-based incentive system described herein. As discussed above, all of the robots have an initial reputation value (e.g., 100) after joining the system. A robot is required to "spend" a certain reputation value to obtain a task. When the task is completed, a pre-defined number (e.g., 4) of legitimate robots successfully verify the corresponding transaction (which records the task execution information). Thereafter, a part of the initially invested reputation value is returned to the task executor as described above. This prevents robots from acquiring an unlimited (or even moderately large) number of tasks without performing them. Moreover, should a robot perform the task incorrectly then it will not receive the refund of its reputation value, thereby being prevented from accepting further tasks.

Performance Analysis

In the following, five metrics for evaluating system performance are introduced, followed by an analysis of how the system performs in different scenarios by demonstrating the results of system simulations in three scenarios (without attacks, with illegitimate intruders, and with intra-fraud). Because the identity management system is based on asymmetric cryptography (e.g., ECDSA), it can inherently prevent identity impersonation problems. Therefore, this scenario is not simulated. Furthermore, Sybil attacks are omitted from the simulation as they are similar in principle to the intra-fraud scenario.

The following are five metrics that can be used to measure the efficiency of a system.

Communication Amount

The ledger synchronisation process is conducted by data transmitting, and the amount of transmission will significantly impact the charging frequency of a robot. As the size of the ledger constantly changes during the system's operation, the maximum synchronization message size is used to calculate the maximum bandwidth required for inter-robot communication. The maximum communication bandwidth is calculated with the average communication amount (CA) per robot per second multiplied by data size.

Time Elapsed to Finish a Certain Number of Tasks

The time spent completing a certain number of tasks in a no-attack scenario is used as a benchmark and compared to the time spent completing the same number of tasks in the presence of illegitimate intruders and malicious robots, respectively, with the same system configuration.

Time to Detect all Malicious Robots

One of the system's goals is to detect malicious robots in the system promptly. The time it takes for the system to locate all malicious robots by batch testing in two attack scenarios (e.g., illegitimate intruder, intra-fraud).

Number of Over-Attachment Nodes in the DAG-DLT

In an embodiment it is specified that a transaction in the DAG-DLT system is validated at most four times by different robots. Nevertheless, a transaction may be validated more than four times due to ledger synchronisation delays. A transaction node validated more than four times is named an over-attachment node. Since too many over-attachment nodes will result in newly submitted transactions not being validated promptly, the severity of this problem is analysed through batch testing.

Number of Tips in DAG-DLT

The total number of Tips (i.e. nodes that have not yet been fully verified) in the ledger should be kept in a certain range (e.g., not exceed 20) to ensure that a transaction can be verified in time. During simulation it is recorded how the number of Tips changes throughout the task cycle for different attack scenarios with the same system configuration.

Simulation Results

We conducted simulations in three different scenarios (e.g., without attacks, with the illegitimate intruder, with intra-fraud) with the same configuration settings to analyse the reliability of the SMARS system.

Multi-Agent System without Attacks

The simulation results in a scenario without attacks will be used as a reference criterion to evaluate the system's performance in other scenarios. Simulation Configuration Table 1 shows the configuration of the simulation.

US 12,580,762 B2

21

TABLE 1

| Configuration of simulation | |
| --- | --- |
| Simulation Configuration | |
| Size x of Warehouse | 8 |
| Size y of Warehouse | 8 |
| Number of Robots in the Swarm | 6 |
| Sensing and Communication Radius of robots | 2 |
| Number of Tasks | 200 |

Table 2 is the simulation results of the no-attack scenario.

TABLE 2

| Simulation results for the non-attack scenario | |
| --- | --- |
| Metric | Value |
| Time elapsed | 10.74 |
| Communication Amount (48 Bytes) | 203 |
| Number of Tips | 10.88 |
| Number of credentials needed in average | 4 |
| Over attachment nodes | 9 |

Trends of Credentials Required

FIG. 10 depicts the dynamic credentials needed for each transaction submitted to the ledger in the non-attack scenario. The blue line represents the changing process of the credentials needed to submit a single transaction. The red line is the simple moving average with a window size of 30 sample points. The red line indicates that the number of credentials required increases at the beginning of the system and then stabilizes. At the beginning of the system, there are not enough Tips in the ledger for the robots to validate, but as the number of tasks performed increases and the number of transactions in the ledger increases, the number of credentials that each robot needs to submit a transaction increases. However, as the system reaches mid-run and the number of Tips within the system stabilizes, the number of credentials required to submit a transaction will also reach a steady state.

Trend of Tips in DAG-DLT

FIG. 11 illustrates that the trend for Tips is similar to credentials, increasing initially but becoming stable as the system runs into the middle stages. The decrease in number of tips at the end stage of the simulation is caused by a decrease in the number of available tasks. Noteworthy is that the number of credentials required to submit a transaction does nevertheless not change.

Multi-agent System with Illegitimate Intruders

The simulation Configuration in Table 3 shows the configuration of the simulation that includes illegitimate intruders.

TABLE 3

| Simulation configuration for illegitimate intruder scenario | |
| --- | --- |
| Simulation settings | |
| Size x of Warehouse | 8 |
| Size y of Warehouse | 8 |
| Number of Robots in the Swarm | 6 |
| Sensing Radius of robots | 2 |
| Number of Malicious robots | 5 |
| Number of Tasks | 200 |

Compared to the no-attack scenario, we added five illegitimate intruders to the system to analyse its robustness and reliability. According to the simulation results in Table 4, almost all the results differ very little from the no-attack scenario.

TABLE 4

| Simulation results including illegitimate intruders | |
| --- | --- |
| Metric | Value |
| Time elapsed | 10.27 |
| Communication Amount | 200.33 |
| Number of Tips | 13.1 |
| Number of credentials needed in average | 3.9 |
| Over attachment nodes | 13 |

The largest deviation of the simulation results from the no-attack scenario is the approximately 30 percent increase in the number of over-attached nodes. Deviation in task completion time was only approximately 4%. The results suggest that even when illegitimate intruders are present, robots equipped with intruder detection sensors (e.g., cameras with pre-trained model) can quickly detect all intruders and report them to the admin robots to prevent them from affecting the system's normal operation. In the simulation all malicious robots were detected within less than 4% of the total simulation time after the system started their impact on the system's normal operation was almost non-existent. FIGS. 12 and 13 show the change in credentials required to submit a transaction and the change in Tips in the ledger over the runtime of the simulation.

Multi-Agent System with Intra-Fraud

Table 5 details the simulation setup for a multi-agent system suffering from intra fraud.

TABLE 5

| Simulation configuration in an intra-fraud scenario | |
| --- | --- |
| Simulation settings | |
| Size x of Warehouse | 8 |
| Size y of Warehouse | 8 |
| Number of Robots in the Swarm | 6 |
| Sensing Radius of robots | 2 |
| Number of Malicious robots | 5 |
| Number of Tasks | 200 |

The intra-fraud simulation configuration is identical to that of the two previously discussed simulation, except for the five malicious robots.

TABLE 6

| Simulation results including intra-fraud | |
| --- | --- |
| Metric | Value |
| Time elapsed | 9.72 |
| Communication Amount | 240.67 |
| Number of Tips | 8.3 |
| Number of credentials needed in average | 4 |
| Over attachment nodes | 4 |

Table 6 shows that the task execution times are almost identical to the simulation results of the first two scenarios. The communication amount increases by about 20% in this scenario since the malicious robots are also involved in the distributed ledger update process during the task execution. Over-attachment nodes represent less than 5% of all nodes in the distributed ledger. This has virtually no impact on the system's operational efficiency. FIGS. 14 and 15 illustrate the change in credentials required to submit a transaction and the change in Tips in the ledger over the time of the simulation, respectively.

It will be appreciated that, because an incorrectly submitted transaction cannot be verified by other robots, no further transactions can be appended to the node representing the transaction. This means that the nodes relating to incorrectly submitted transactions submitted by malicious robots will become orphaned without further transactions being appended to them. In the simulation scenarios all malicious robots were detected within 8% of the simulation time. Detecting all the malicious robots in the intra-fraud scenario takes longer, since these robots can only be confirmed as malicious robots via the transaction verification processes.

Batch Testing

Further evaluations of embodiments include batch tests in which each of the above simulations is repeated with varying simulation configurations. Specifically, the change in task execution time and communication amount with increasing task number in the no-attack scenario are evaluated in addition to the change in communication amount as the number of robots increases.

System Performance with the No-Attack Scenario

Three groups of batch tests for each non-attack configuration were conducted. Each batch includes 10 simulations for each configuration.

The first set of tests was based on the configurations summarised in Table 7.

TABLE 7

| Configuration of a non-attack batch test | |
| --- | --- |
| Simulation settings | |
| Size x of Warehouse | 5 |
| Size y of Warehouse | 5 |
| Number of Robots in the Swarm | 5 |
| Sensing Radius of robots | 1 |
| Number of Tasks | (100, 1000) |

Fixing the number of robots at 5 and setting the number of tasks in the range of (100, 1000) with an interval of 100. For each configuration combination, a simulation was run ten times to get an average value. The line in FIG. 16 indicates the average time elapsed to complete a fixed number of tasks. The time to complete all the tasks does not increase linearly as the number of tasks grows. With the number of tasks increasing, the verification process takes more time to ensure that newly submitted transactions are verified promptly. The communication amount is also increasing with respect to the number of tasks, as depicted in FIG. 17.

System Performance with Different Sensing and Communication Radius

A further batch test was carried out with the configuration in Table 8.

TABLE 8

| Sensing and communications radius dependent simulation settings | |
| --- | --- |
| Simulation settings | |
| Size x of Warehouse | 25 |
| Size y of Warehouse | 25 |

24

TABLE 8-continued

| Sensing and communications radius dependent simulation settings | |
| --- | --- |
| Simulation settings | |
| Number of Robots in the Swarm | 6 |
| Sensing Radius of robots | (1, 5) |
| Number of Tasks | 300 |

As can be seen from FIGS. 18 and 19, with all other parameters fixed, the number of Tips in the DAG-DLT ledger and the amount of inter-robot communication significantly decreased as the sensing radius increased (shown on the abscissa in multiples of the unit storage location size used in the simulation). Additionally, the time required to finish all the tasks initialized was reduced, as shown in FIG. 20. The number of credentials required (as shown in FIG. 21) for each robot to submit a transaction fluctuates slightly as the sensing and communication range increases, but the average value is around 4. Taken together, this means that a larger sensing and communication range benefits the system's overall performance.

Different sensory and communication range settings can affect the frequency of ledger synchronisation between robots and even result in synchronisation latency problems. As the robots' communication range is limited, different robots may store different versions of the distributed ledger. As previously mentioned, a certain number of robots could verify a single transaction. However, due to the ledger synchronisation latency problem, a transaction may be verified more than that amount, which will reduce the system's efficiency. This can be defined as an over-attachment problem. Controlling that a transaction can be verified at certain times, for example by adjusting the communication range settings of individual or all robots on the system, ensures that the number of transactions that need to be verified (aka Tips) in the system will not exceed a predetermined value.

Number of Over-Attachment Nodes in the DAG-DLT Graph

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A multi-agent system comprising:

an administrator configured to maintain a directed acyclic graph, hereinafter DAG, to update and allocate tasks, and to maintain a list of members in the multi-agent system, all completed tasks being posted to a distributed ledger in a form of transactions; and a plurality of autonomous robots using asymmetric encryption for identification to at least one of the administrator or other robots of the plurality of autonomous robots, the DAG recording the transactions performed by the autonomous robots, a transaction included in the transactions forming a node in the DAG, the transactions being posted by the autonomous robots, and the autonomous robots accessing a dynamic task list of the tasks, wherein a first robot of the plurality of autonomous robots is configured to obtain a physical task from the dynamic task list, to perform the physical task and to, upon completion of the physical task, append task completion information to the DAG, and another robot of the plurality of autonomous robots is configured to, independent of the autonomous robots that has appended the completion information to the DAG, using physical verification and cryptographic verification, verify that a task appended to the DAG by the first robot that has appended the completion information to the DAG has been completed in accordance with the completion information, wherein the cryptographic verification includes checking a cryptographic identifier of the autonomous robots that has appended the completion information to the DAG, the another robot having different technical ability from the first robot.

2. The multi-agent system as claimed in claim 1 wherein a second robot of the plurality of autonomous robots is permitted to submit completion information to the administrator if the second robot of the plurality of autonomous robots has, using physical verification and cryptographic verification, verified a predetermined number of other pieces of completion information previously submitted to the DAG.

3. The multi-agent system as claimed in claim 2, wherein a third robot of the plurality of autonomous robots is configured to, once the DAG has been initialised, only submit completion information to an auditor for appending to previously submitted completion information that has been verified by the third robot using physical verification and cryptographic verification.

4. The multi-agent system as claimed in claim 1, wherein the administrator maintains a list of tasks required to be completed, the administrator being configured to submit information of one or more tasks to be completed to robots of the plurality of autonomous robots.

5. The multi-agent system as claimed in claim 4, wherein the administrator is further configured to require investment by the first robot of the plurality of autonomous robots of a reputation value in exchange for the information of one or more tasks to be completed.

6. The multi-agent system as claimed in claim 5, wherein the administrator is configured to reward a fourth robot of the plurality of autonomous robots by apportioning a part of an invested reputation value to a robot that has submitted verifying information that a task appended to the DAG by the fourth robot of the autonomous robots that has appended the completion information to the DAG has been completed in accordance with the completion information.

7. The multi-agent system as claimed in claim 1, wherein the administrator is configured to make available previously submitted completion information for appending new completion information to in the DAG, if a number of verifications of the previously submitted completion information received by the administrator does not exceed a predetermined number.

8. The multi-agent system as claimed in claim 1, wherein the first robot of the plurality of autonomous robots generates the completion information by signing information including an identifier of the task appended to the DAG by the autonomous robot and an indication of a physical location associated with a completed task with a public key of the first robot prior to submitting the completion information to the administrator.

9. The multi-agent system as claimed in claim 1, wherein the administrator is configured to compare the cryptographic verification and the physical verification of completion information previously posted to the DAG received from different robots of the plurality of autonomous robots and, in cases where the cryptographic verification and the physical verification received from different robots differ, determine which of the cryptographic verification and the physical verification is to be treated as correct.

10. An autonomous robot, comprising:
circuitry configured to
obtain a physical task from a dynamic task list, perform the physical task and to, upon completion of the physical task, submit completion information to an administrator of the dynamic task list for appending task completion information to a DAG, the administrator maintaining the DAG to update and allocate tasks, the DAG recording transactions performed by autonomous robots, a transaction included in the transactions forming a node in the DAG, the transactions being posted by the autonomous robots, and the autonomous robots accessing the dynamic task list, and obtain information relating to tasks appended to the DAG by another autonomous robot, independent of other autonomous robots, using physical verification and cryptographic verification to verify that a task appended to the DAG by the another autonomous robot has been completed in accordance with the information relating to tasks appended to the DAG, wherein the cryptographic verification includes checking a cryptographic identifier of the other autonomous robots that has appended the completion information to the DAG.

11. The autonomous robot claimed in claim 10, further comprising sensors configured to sense the robot's surroundings, the sensors having a sensory range and the robot being configured to identify objects relating to tasks completed by at least one of other robots or other robots within a sensory range of the autonomous robot.

12. The autonomous robot claimed in claim 10, wherein the circuitry is configured to identify objects relating to tasks completed by the other autonomous robots and to obtain, from the DAG, information appended to the DAG and relating to the identified objects, the obtained information including location information of a location of an object of the objects after completion of the task appended to the DAG by the another autonomous robot and to compare a current physical location of the object with the location information.

13. The autonomous robot claimed in claim 10, wherein the circuitry is configured to provide to the administrator or broadcast to the other autonomous robots an identity of the another autonomous robot deemed to have posted an incorrect physical location to the DAG.

14. The autonomous robot claimed in claim 10, wherein the circuitry is configured to operate within a system and to access records of the other autonomous robots authenticated to operate within the system, wherein the obtained information further includes an identifier of the autonomous robot that has posted the information to the DAG, the autonomous robot being configured to compare the identifier with the accessed records.

15. The autonomous robot claimed in claim 10, wherein the circuitry is configured to obtain a copy or a partial copy of the DAG from the administrator and to prune the copy of the DAG by deleting non-current transaction information relating to an object or transaction information relating to the object that has been superseded by a predetermined number of more recent transactions relating to the object.

16. The autonomous robot claimed in claim 10, wherein the circuitry is configured to store information confirming a physical location of an object.

17. The autonomous robot claimed in claim 10, wherein the circuitry is configured to synchronise a stored copy of the DAG with other copies of the DAG stored by another autonomous robot when within communication range of the another autonomous robot.

18. The autonomous robot claimed in claim 10, wherein the circuitry is configured to update a stored ledger upon receiving a distributed ledger sync message from the another autonomous robot.

19. An administration robot for a multi-agent system comprising a plurality of autonomous robots, the administration robot comprising:

circuitry configured to maintain a directed acyclic graph, hereinafter DAG, to update and allocate tasks, and to maintain a list of members in the multi-agent system, all completed tasks being posted to a distributed ledger in a form of transactions, the DAG including a history of tasks completed by the plurality of autonomous robots, the DAG recording the transactions performed by the autonomous robots, a transaction included in the transactions forming a node in the DAG, and the transactions being posted by the autonomous robots, and to treat a task posted to the DAG as verified once the administration robot has received a predetermined number of physical and cryptographic verifications of the task from the autonomous robots in the multi-agent system other than from a robot in the multi-agent system that has posted the task to the DAG.

20. The administration robot as claimed in claim 19, further configured to provide information of tasks previously posted to the DAG that need to be verified to an autonomous robot in the system, wherein the administration robot is configured to obtain information regarding a current location of the autonomous robot within the system and to select a task to be verified from the DAG based on a proximity of the task to be verified and the current location of the autonomous robot in the system.

* * * * *